(12) United States Patent
Lee et al.

(10) Patent No.: US 12,341,356 B2
(45) Date of Patent: Jun. 24, 2025

(54) ELECTRONIC DEVICE AND METHOD FOR CONTROLLING WIRELESS CHARGING IN ELECTRONIC DEVICE

(71) Applicant: SAMSUNG ELECTRONICS CO., LTD., Suwon-si (KR)

(72) Inventors: Jeongman Lee, Suwon-si (KR); Beomwoo Gu, Suwon-si (KR); Jaeseok Park, Suwon-si (KR); Jaehyun Park, Suwon-si (KR); Sungku Yeo, Suwon-si (KR); Chongmin Lee, Suwon-si (KR); Hyoseok Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 528 days.

(21) Appl. No.: 17/330,932

(22) Filed: May 26, 2021

(65) Prior Publication Data

US 2021/0376668 A1 Dec. 2, 2021

(30) Foreign Application Priority Data

May 28, 2020 (KR) .......................... 10-2020-0064003
Jul. 24, 2020 (KR) .......................... 10-2020-0092342

(51) Int. Cl.
*H02J 50/90* (2016.01)
*H02J 50/12* (2016.01)
(Continued)

(52) U.S. Cl.
CPC .............. *H02J 50/90* (2016.02); *H02J 50/12* (2016.02); *H02J 50/40* (2016.02); *H02J 50/80* (2016.02)

(58) Field of Classification Search
CPC ..................................................... H02J 50/90
See application file for complete search history.

(56) References Cited

U.S. PATENT DOCUMENTS 6,321,067 B1 * 11/2001 Suga .................. G06K 19/0701
455/41.2
2010/0277003 A1 11/2010 Von Novak et al.
(Continued)

FOREIGN PATENT DOCUMENTS

KR 10-2011-0134912 12/2011
KR 10-2013-0073862 7/2013
(Continued)

OTHER PUBLICATIONS

International Search Report and Written Opinion dated Sep. 6, 2021 in corresponding International Application No. PCT/KR2021/006629.
(Continued)

*Primary Examiner* — Tynese V McDaniel
(74) *Attorney, Agent, or Firm* — Nixon & Vanderhye, P.C.

(57) ABSTRACT

The disclosure provides an electronic device and a method for controlling wireless charging in the electronic device. An electronic device includes: a sensor, a battery, a resonance circuit configured to wirelessly receive power, a rectification circuit configured to rectify an alternating current (AC) power provided from the resonance circuit into a direct current (DC) power, a DC/DC converter configured to convert the DC power provided from the rectification circuit to output a converted power, a charging control circuit configured to charge the battery using the converted power provided from the DC/DC converter, and a controller, and the controller may be configured to: identify movement information of the electronic device corresponding to a value sensed via the sensor, identify a voltage value of the DC power rectified via the rectification circuit, and control an output of the DC/DC converter based on the movement information and the voltage value.

18 Claims, 23 Drawing Sheets

(51) Int. Cl.
  *H02J 50/40* (2016.01)
  *H02J 50/80* (2016.01)

(56) References Cited

U.S. PATENT DOCUMENTS

| | | | | |
|---|---|---|---|---|
| 2011/0234012 | A1* | 9/2011 | Yi | H02J 50/12 |
| | | | | 307/104 |
| 2014/0091641 | A1* | 4/2014 | Ichikawa | B60L 50/51 |
| | | | | 307/104 |
| 2014/0375256 | A1 | 12/2014 | Lee et al. | |
| 2015/0349538 | A1* | 12/2015 | Agostinelli | H02J 50/12 |
| | | | | 307/104 |
| 2016/0036243 | A1* | 2/2016 | Hayashi | H02J 50/10 |
| | | | | 307/104 |
| 2016/0268815 | A1* | 9/2016 | Lee | H02J 50/90 |
| 2017/0040831 | A1* | 2/2017 | Desai | H02J 50/12 |
| 2017/0240061 | A1 | 8/2017 | Waters | |
| 2017/0288739 | A1* | 10/2017 | Shin | H04W 36/08 |
| 2018/0166922 | A1* | 6/2018 | Chung | H02J 50/12 |

FOREIGN PATENT DOCUMENTS

| | | |
|---|---|---|
| WO | 2015/117031 | 8/2015 |
| WO | 2019/182808 | 9/2019 |

OTHER PUBLICATIONS

Extended Search Report dated Sep. 8, 2023 in European Patent Application No. 21812225.7.
Office Action dated Oct. 7, 2024 in Korean Patent Application No. 10-2020-0092342 and English-language translation.

* cited by examiner

|  | Eff.1 | Eff.2 | $P_{TX\_IN}$ | $P_{RECT\_1}$ | $P_{RECT\_2}$ |
|---|---|---|---|---|---|
| k1 = 0.00236<br>k2 = 0.00236<br>$(R_L^1, R_L^2) = (5,5)$ | 0.048 | 0.048 | 25.585W | 1.227W | 1.227W |
| | | ↓ DECREASE | ↓ INCREASE | | |
| k1=0.005<br>k2 = 0.00236<br>$(R_L^1, R_L^2) = (5,5)$ | 0.161 | 0.036 | 34.057W | 5.495W | 1.224W |
| | | ↓ MITIGATION | ↓ MITIGATION | | |
| k1 = 0.005<br>k2 = 0.00236<br>$(R_L^1, R_L^2) = (\mathbf{25},5)$ | 0.114 | 0.046 | 26.838W | 3.057W | 1.229W |

| | Eff.1 | Eff.2 | $P_{TX\_IN}$ | $P_{RECT\_1}$ | $P_{RECT\_2}$ |
|---|---|---|---|---|---|
| k1 = 0.00236<br>k2 = 0.00236<br>$(R_L^1, R_L^2) = (5,5)$ | 0.046 | 0.046 | 24.308W | 1.109W | 1.109W |
| | | ↓ DECREASE | ↓ DECREASE | | |
| k1=0.005<br>k2 = 0.00236<br>$(R_L^1, R_L^2) = (5,5)$ | 0.156 | 0.035 | 18.478W | 2.875W | 0.641W |
| | | ↓ MITIGATION | ↓ MITIGATION | | |
| k1 = 0.005<br>k2 = 0.00236<br>$(R_L^1, R_L^2) = $ (25,5) | 0.108 | 0.044 | 23.250W | 2.507W | 1.016W |

ELECTRONIC DEVICE AND METHOD FOR CONTROLLING WIRELESS CHARGING IN ELECTRONIC DEVICE

CROSS-REFERENCE TO RELATED APPLICATIONS

This application is based on and claims priority under 35 U.S.C. § 119 to Korean Patent Application No. 10-2020-0064003, filed on May 28, 2020, in the Korean Intellectual Property Office, and Korean Patent Application No. 10-2020-0092342, filed on Jul. 24, 2020, in the Korean Intellectual Property Office, the disclosures of which are incorporated herein by reference in their entireties.

BACKGROUND

Field

The disclosure relates to an electronic device and a method for controlling wireless charging in the electronic device.

Description of Related Art

With a recent development of a wireless charging technology, a method of charging by providing a power from one charging device (e.g., a wireless power transmitter) to various electronic devices (e.g., a wireless power receiver) has been studied. A wireless charging technology includes an electromagnetic induction scheme using a coil, a resonance scheme using a resonance, and a radio frequency (RF)/microwave radiation scheme which converts electrical energy into a microwave and transfers the converted microwave.

In recent years, a wireless charging technology using an electromagnetic induction scheme or a resonance scheme has been widely used in electronic devices such as smart phones. If a wireless power transmitter (or a power transmitting unit (PTU))(e.g., a wireless charging pad or a wireless charging device) and a wireless power receiver (or a power receiving unit (PRU))(e.g., a smart phone or an electronic device) come into contact or approach within a predetermined distance, a battery of the wireless power receiver (e.g., the electronic device) may be charged by a method such as an electromagnetic induction, or an electromagnetic resonance, and/or the like between a transmission coil of the wireless power transmitter and a reception coil of the wireless power receiver.

If one wireless power transmitter intends to charge one or more wireless power receivers, a magnitude of a power which each wireless power receiver may receive or a magnitude of a power which the wireless power transmitter may transmit may be changed according to a degree of coupling (e.g., a coupling coefficient k) between the wireless power transmitter and each wireless power receiver.

For example, if a distance between a wireless power transmitter and a wireless power receiver of a plurality of wireless power receivers changes as the wireless power receiver moves while the wireless power transmitter charges the plurality of wireless power receivers, a transmission impedance (e.g., a transmission-side resonator impedance) of the wireless power transmitter changes, so overall power transfer efficiency may decrease or a magnitude of a reception power of a specific wireless power receiver may decrease.

SUMMARY

Embodiments of the disclosure may provide an electronic device and a method for controlling wireless charging in the electronic device which may increase power transfer efficiency of an entire system and stabilize a reception power of a wireless power receiver by changing an impedance (e.g., a load impedance at an output terminal of a DC/DC converter or a reception-side rectifier impedance at a rear end of a rectification circuit) of the wireless power receiver when the wireless power receiver moves while a wireless power transmitter charges the wireless power receiver.

An electronic device according to an example embodiment for addressing the above or other problems may comprise: a sensor, a battery, a resonance circuit configured to wirelessly receive power based on an external electromagnetic field, a rectification circuit configured to rectify an alternating current (AC) power provided from the resonance circuit into a direct current (DC) power, a DC/DC converter configured to convert the DC power provided from the rectification circuit to output a converted power, a charging control circuit configured to charge the battery using the converted power provided from the DC/DC converter, and a controller, and the controller may be configured to: identify movement information of the electronic device corresponding to a value sensed via the sensor, identify a voltage value of the DC power rectified via the rectification circuit, and control an output of the DC/DC converter based on the movement information and the voltage value.

A method for controlling wireless charging in an electronic device according an example embodiment may comprise: receiving a first power from a wireless power transmitter, identifying movement information of the electronic device corresponding to a value sensed via a sensor, identifying a voltage value of a direct current (DC) power rectified via a rectification circuit which is configured to rectify the received first power into the DC power, and controlling an output of a DC/DC converter which is configured to convert the rectified DC power to output a converted power based on the movement information and the voltage value.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 7A, 7B, 7C, and 7D are diagrams illustrating an experimental result in a serial-type resonance circuit according to various embodiments;

FIGS. 8A, 8B, 8C, and 8D are diagrams illustrating an experimental result in a parallel-type resonance circuit according to various embodiments;

DETAILED DESCRIPTION

Hereinafter, various example embodiments of the present disclosure will be described in greater detail with reference to the accompanying drawings. It will be noted that the same reference notations may be used to refer to the same components throughout the disclosure and the drawings. When determined to make the subject matter of the present disclosure unclear, the detailed description of the known art or functions may be omitted.

Figure 1:
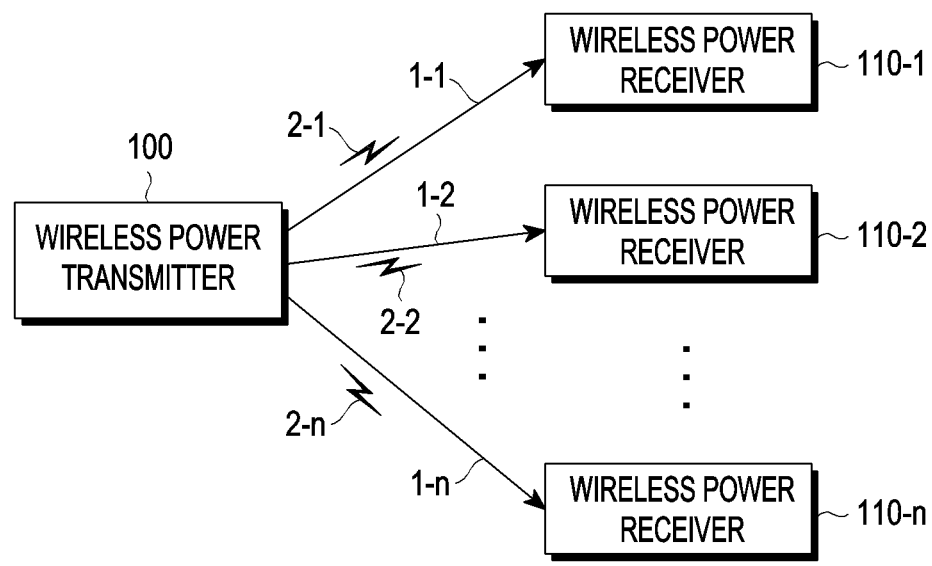
FIG. 1 is a diagram illustrating an example of overall operation of a wireless charging system according to various embodiments.

FIG. 1 is a diagram illustrating an example overall operation of a wireless charging system according to various embodiments. As shown in FIG. 1, the wireless charging system includes a wireless power transmitter (e.g., including power transmitting circuitry) 100 (e.g., a power transmitting unit (PTU)) and at least one wireless power receiver (e.g., including power receiving circuitry) 110-1, 110-2, to 110-$n$ (e.g., a power receiving unit (PRU)).

The wireless power transmitter 100 may wirelessly transmit a power 1-1, 1-2, to 1-$n$ to the at least one wireless power receiver 110-1, 110-2, to 110-$n$, respectively. For example, the wireless power transmitter 100 may wirelessly transmit the power 1-1, 1-2, to 1-$n$ to an authenticated wireless power receiver which performs a predetermined authentication procedure.

The wireless power transmitter 100 may establish an electrical connection with the wireless power receiver 110-1, 110-2, to 110-$n$. For example, the wireless power transmitter 100 may transmit a wireless power in a form of an electromagnetic wave to the wireless power receiver 110-1, 110-2, to 110-$n$.

The wireless power transmitter 100 may perform a bidirectional communication with the wireless power receiver 110-1, 110-2, to 110-$n$. The wireless power transmitter 100 and the wireless power receiver 110-1, 110-2, to 110-$n$ may process or transmit/receive a packet 2-1, 2-2, to 2-$n$ which may include, for example, a predetermined frame. According to various embodiments, the wireless power receiver 110-1, 110-2, to 110-$n$ may be implemented as, or included in, for example, and without limitation, a mobile communication terminal, a PDA, a PMP, or a smart phone, and/or the like.

The wireless power transmitter 100 may wirelessly provide a plurality of wireless power receivers 110-1, 110-2, and 110-$n$ with a power. For example, the wireless power transmitter 100 may transmit a power to the plurality of wireless power receivers 110-1, 110-2, and 110-$n$ based on a resonance scheme. If the wireless power transmitter 100 adopts the resonance scheme, a distance between the wireless power transmitter 100 and the plurality of wireless power receivers 110-1, 110-2, and 110-$n$ may be, for example, 30 cm or less, but is not limited thereto. If the wireless power transmitter 100 adopts an electromagnetic induction scheme, a distance between the wireless power transmitter 100 and the plurality of wireless power receivers 110-1, 110-2, and 110-$n$ may be, for example, 10 cm or less, but is not limited thereto.

The wireless power receiver 110-1, 110-2, to 110-$n$ may receive a wireless power from the wireless power transmitter 100 to charge a battery provided therein. The wireless power receiver 110-1, 110-2, to 110-$n$ may transmit, to the wireless power transmitter 100, a signal for requesting wireless power transmission, information required for wireless power reception, or status information of the wireless power receiver 110-1, 110-2, to 110-$n$ (e.g., information related to location movement of the wireless power receiver 110-1, 110-2, to 110-$n$), or control information of the wireless power transmitter 100, and/or the like. Information related to a transmission signal will be described in greater detail below.

Further, each of the wireless power receivers 110-1, 110-2 and 110-$n$ may transmit a message indicating a charging state to the wireless power transmitter 100.

Each of the wireless power transmitter 100 or the wireless power receivers 110-1, 110-2, and 110-$n$ may include a display. For example, the wireless power transmitter 100 may display a state of each of the wireless power receivers 110-1, 110-2, and 110-$n$ based on a message received from each of the wireless power receivers 110-1, 110-2, and 110-$n$. The wireless power transmitter 100 may also display time expected to take until charging of each of the wireless power receivers 110-1, 110-2, and 110-$n$ is completed.

The wireless power transmitter 100 may transmit a control signal to enable or disable a wireless charging function to each of the wireless power receivers 110-1, 110-2, and 110-$n$. For example, the wireless power receiver 110-1, 110-2, and 110-$n$ receiving a disable control signal for the wireless charging function from the wireless power transmitter 100 may disable the wireless charging function.

Figure 2A:
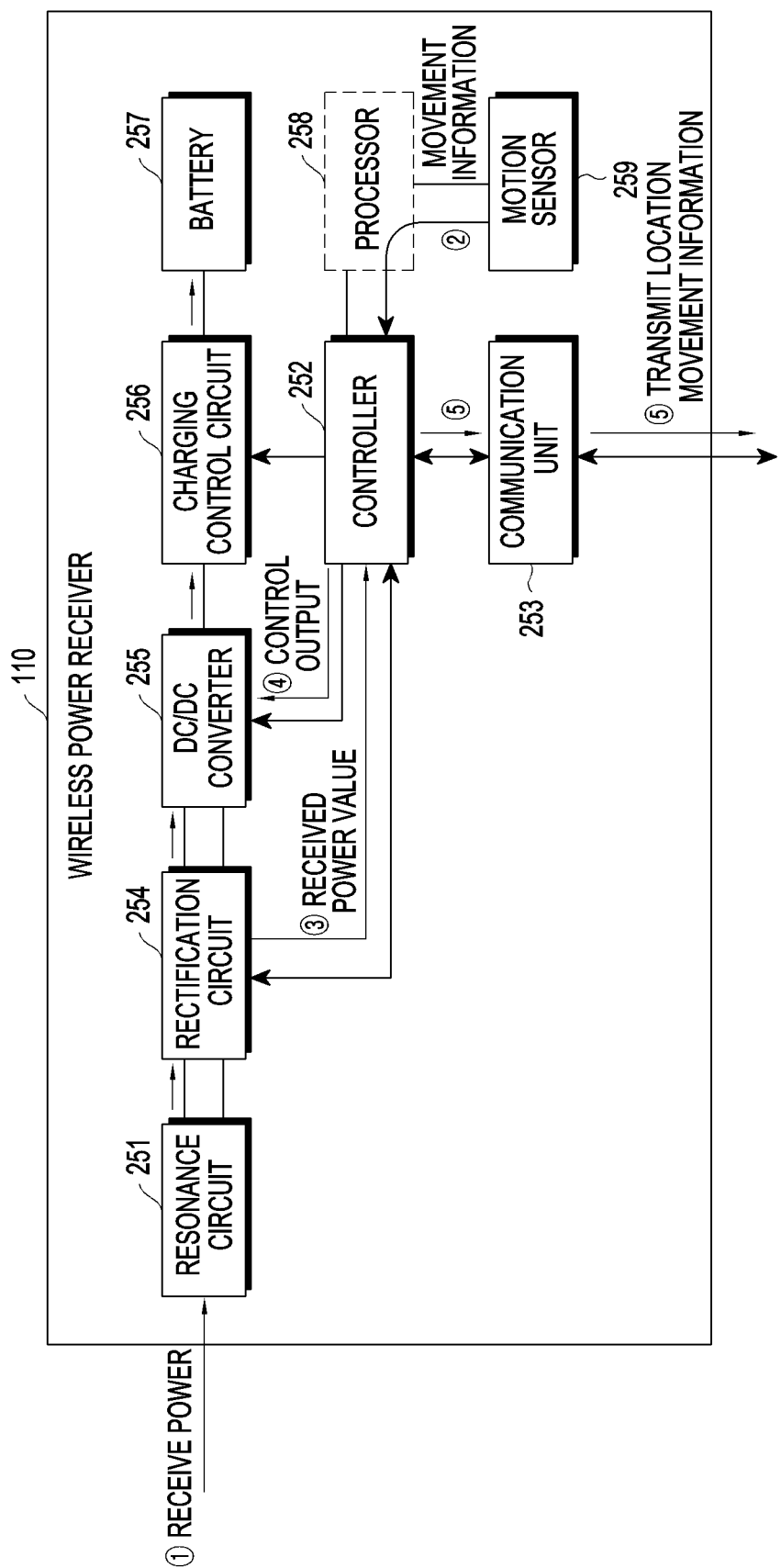
FIG. 2A is a block diagram illustrating an example wireless power receiver according to various embodiments.
Figure 2B:
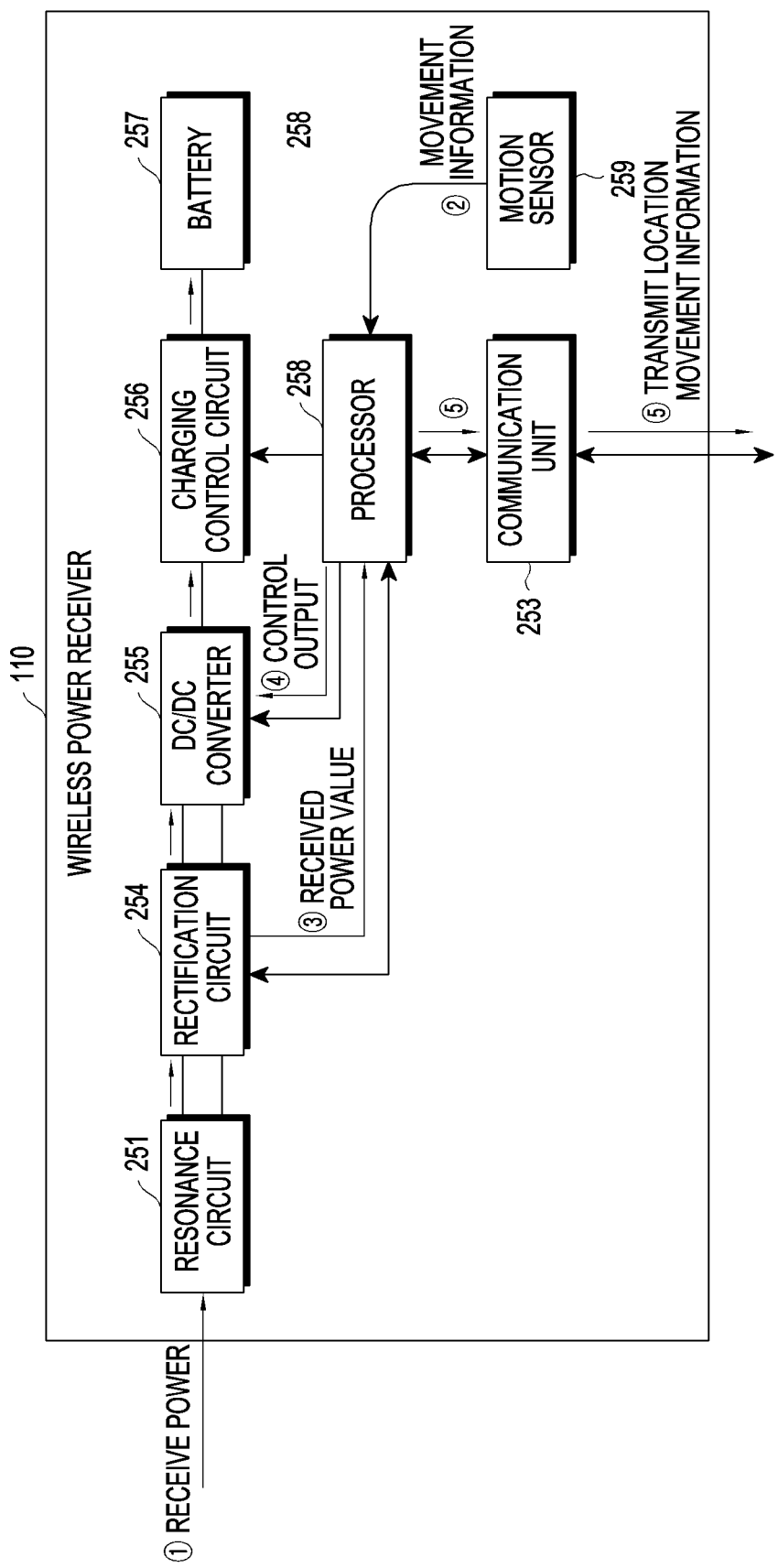
FIG. 2B is a block diagram illustrating an example wireless power receiver according to various embodiments.

FIGS. 2A and 2B are block diagrams illustrating example wireless power receivers according to various embodiments.

According to an embodiment, a wireless power receiver 110 may include at least one of a resonance circuit 251, a controller (e.g., including processing or controlling circuitry) 252, a communication unit (e.g., including communication circuitry) 253, a rectification circuit 254, a DC/DC converter 255, a charging control circuit 256 (e.g., a power management integrated circuit (PMIC)), a battery 257, a processor (e.g., including processing circuitry) 258 (e.g., an application processor (AP) or a communication processor (CP)), and/or at least one sensor (e.g., a motion sensor) 259.

According to an embodiment, in the resonance circuit 251, an induced electromotive force may be generated based on a magnetic field and/or an electric field output or formed by a wireless power transmitter (e.g., a wireless power transmitter in FIG. 1), and this process may be expressed as the wireless power receiver 110 receives a wireless power or wirelessly receives a power. An alternating current (AC) power received via the resonance circuit 251 may be transferred to the rectification circuit 254. The resonance circuit 251 may include, for example, at least one coil and at least one capacitor. There is no limitation to a structure in which the at least one coil and the at least one capacitor are connected. For example, the at least one coil and the at least one capacitor may be connected in parallel or connected in serial.

According to an embodiment, the rectification circuit 254 may rectify an AC power provided from the resonance circuit 251 into a direct current (DC) power. The rectification circuit 254 may include a bridge circuit (e.g., a full-bridge circuit or a half-bridge circuit). For example, the rectification circuit 254 may transfer a rectified power to the DC/DC converter 255 according to a switching operation of the bridge circuit. An output voltage $V_{RECT}$ or an output current $I_{RECT}$ measured at an output terminal of the rectification circuit 254 may be sensed by a voltage sensor or a current sensor and transferred to the controller 252.

According to an embodiment, the DC/DC converter 255 may convert a voltage of the rectified power transferred from the rectification circuit 254. The DC/DC converter 255 may output a power having a substantially constant voltage by being implemented as a regulator (e.g., a linear regulator or a switching regulator). A specific embodiment of controlling a voltage and/or a current output from the DC/DC converter 255 will be described in greater detail below with reference to FIG. 9. Meanwhile, the DC/DC converter 255 may be connected to at least one hardware (or the charging control circuit 256 (e.g., a power management integrated circuit (PMIC)) for providing hardware with a power)). The at least one hardware (or the PMIC of corresponding hardware) may operate using a power from the DC/DC converter 255. The DC/DC converter 255 may be implemented as one DC/DC converter or may be implemented as a plurality of DC/DC converters. For example, the DC/DC converter 255 may include a first DC/DC converter for providing the charging control circuit 256 with a power and a second DC/DC converter for providing the controller 252 with a power.

According to an embodiment, the charging control circuit 256 may receive a power output from the DC/DC converter 255 and charge the battery 257 connected to the charging control circuit 256 using the received power. The charging control circuit 256 may control a current and/or voltage applied to the battery 257 based on various charging modes (e.g., a constant current (CC) mode, a constant voltage (CV) mode, or a fast charging mode, and/or the like). For example, the charging control circuit 256 may control the current and/or voltage applied to the battery 257 based on a charging state of the battery 257. According to an embodiment, the charging control circuit 256 may control to charge the battery 257 in the CC mode until a charging amount of the battery 257 reaches a set value (e.g., 80%), and control to charge the battery 257 in the CV mode after the charging amount of the battery 257 reaches the set value. According to an embodiment, the charging control circuit 256 may control the current and/or voltage applied to the battery 257 based on a user input. For example, the charging control circuit 256 may control charging for the battery 257 according to setting of charging time or a charging schedule which corresponds to a user input. The battery 257 is not limited in its type as long as it is a chargeable secondary battery.

According to an embodiment, the wireless power receiver 110 may wirelessly receive a power from the wireless power transmitter 100 via the resonance circuit 251 as described above (①). The wireless power transmitter 100 may adjust a transmission power by considering a maximum voltage, a minimum voltage, and a required voltage required by each wireless power receiver 110.

Figure 4A:
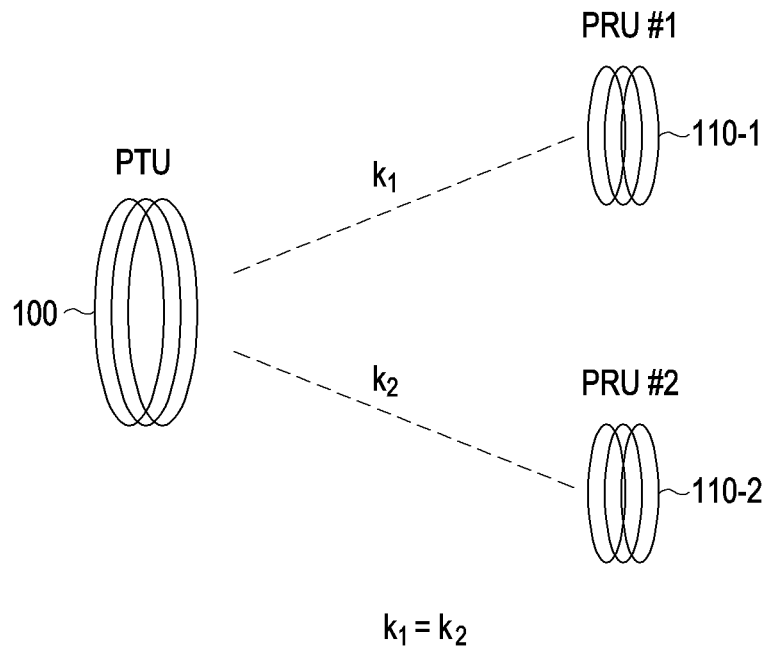
FIGS. 4A and 4B are diagrams illustrating example movement of a wireless power receiver according to various embodiments.
Figure 4B:
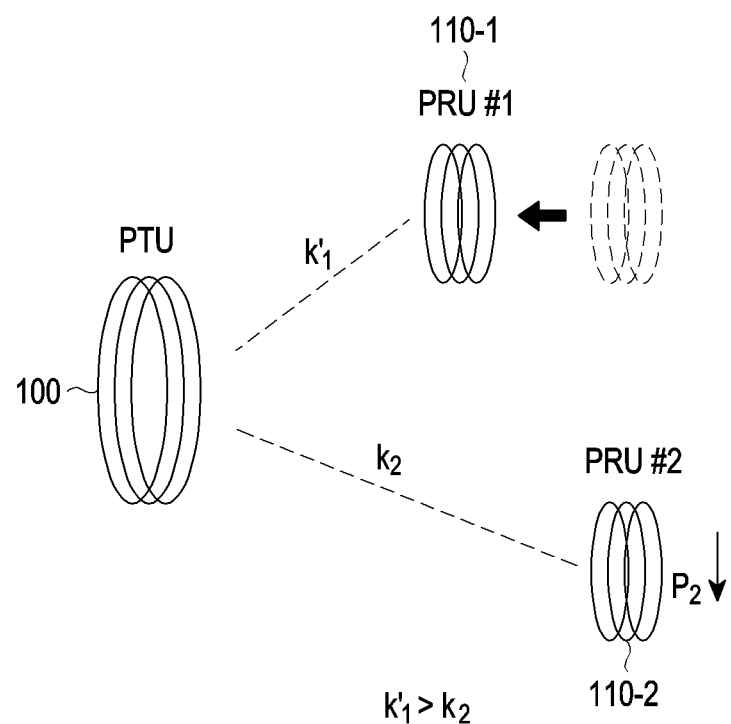

According to an embodiment, while the wireless power receiver 110 is disposed in a first location, the wireless power receiver 110 may receive a power of a constant magnitude from the wireless power transmitter 100. If the wireless power receiver 110 is closer to the wireless power transmitter 100 or farther away from the wireless power transmitter 100 as the wireless power receiver 110 moves from the first location to a second location, a coupling coefficient k may be changed as shown in FIGS. 4A and 4B. The coupling coefficient k is a value indicating a degree to which a magnetic field or magnetic flux which is generated in a coil of a resonance circuit of the wireless power transmitter is used to substantially generate a current in a coil of a resonance circuit of the wireless power receiver 110, and may be defined, by way of example, as in Equation (1) below.

$$k = \frac{M}{\sqrt{L_1 L_2}} \qquad (1)$$

In Equation (1), M may denote a mutual inductance, $L_1$ may denote a self inductance of the resonance circuit of the wireless power transmitter, and $L_2$ may denote a self inductance of the resonance circuit of the wireless power receiver. The coupling coefficient k may have a value between 0 and 1. For example, the shorter a distance between the wireless power transmitter and the wireless power receiver is, the larger the coupling coefficient k may be.

For example, referring to FIGS. 4A and 4B, it will be assumed that the wireless power transmitter 100 charges a plurality of wireless power receivers (e.g., a first wireless power receiver 110-1 and a second wireless power receiver 110-2) at the same time. Referring to FIG. 4A, a coupling coefficient k between the wireless power transmitter 100 and the first wireless power receiver 110-1 may be k1, and a coupling coefficient k between the wireless power transmitter 100 and the second wireless power receiver 110-2 may be k2. For convenience of description, it may be assumed that k1 and k2 are the same, but are not limited thereto.

As the first wireless power receiver 110-1 moves to the second location as shown in FIG. 4B while receiving a wireless power at the first location as shown in FIG. 4A, a distance between the wireless power transmitter 100 and the first wireless power receiver 110-1 may be shorter than a distance therebetween before the movement. Accordingly, if the distance between the wireless power transmitter 100 and the first wireless power receiver 100-1 is shorter than the distance therebetween before the movement, a coupling coefficient k may be larger than a coupling coefficient k before the movement. For example, as the first wireless power receiver 110-1 moves from the first location to the second location, a coupling coefficient k may increase from $k_1$ to $k'_1$.

If a coupling coefficient k between the wireless power transmitter 100 and the first wireless power receiver 110-1 is larger than a coupling coefficient k therebetween before a movement according to the movement of the first wireless power receiver 110-1, a transmission impedance of the wireless power transmitter 100 (e.g., a transmission-side resonator impedance $Z_{TX\_IN}$) changes (e.g., increases or decreases), so a transmission power transmitted from the wireless power transmitter 100 to each of the wireless power receivers 110-1 and 110-2 may change. According to various embodiments, the transmission-side resonator impedance may be an impedance value identified in a resonance circuit 313 of the wireless power transmitter 100, and may be calculated, for example, by $Z_{TX\_IN}=V_{TX\_IN}/I_{TX\_IN}$ from a transmission voltage $V_{TX\_IN}$ and a transmission current $I_{TX\_IN}$ which are measured at an input terminal of the resonance circuit 313 (refer to FIG. 3).

According to an embodiment, if one wireless power receiver (e.g., the first wireless power receiver 110-1) of a plurality of wireless power receivers moves and is closer to the wireless power transmitter 100 while the wireless power transmitter 100 charges the plurality of wireless power receivers, a received power and/or overall power transfer efficiency of another wireless power receiver (e.g., the second wireless power receiver 110-2) may decrease. An example of this will be described in greater detail below with reference to FIGS. 7A, 7B, 7C, 8A, 8B, and 8C.

In an embodiment to be described later, even if a distance between a specific wireless power receiver 110 (e.g., the first wireless power receiver 110-1) and the wireless power transmitter 100 changes according to the movement of the specific wireless power receiver 110 and a coupling coefficient k changes as described above, power transfer efficiency (e.g., a ratio $P_{RECT}/P_{TX\_IN}$ of a reception power to a transmission power) may be increased through a change in an impedance of the moved wireless power receiver 110 (e.g., a change in a load impedance ($Z_{OUT}$) or a change in a reception-side rectifier impedance ($Z_{RECT}$)).

Referring to FIG. 2A, according to an embodiment, the wireless power receiver 110 may detect a movement of the wireless power receiver 110 while receiving (①) a power from the wireless power transmitter 100. For example, the wireless power receiver 110 may detect a movement of the wireless power receiver 110 via at least one sensor (e.g., a motion sensor 259). An example of the motion sensor 259 for detecting the movement may include, for example, a gyro sensor, an acceleration sensor, a gravity sensor, a geomagnetic sensor, and an infrared sensor, but is not limited thereto. A data sensed by the sensor (e.g., the motion sensor 259) may be directly provided to the controller 252, or may be provided to the controller 252 via at least one processor 258 (e.g., an application processor (AP) or a communication processor (CP)) (②). For example, if the resonance circuit 251, the rectification circuit 254, the DC/DC converter 255, and the controller 252 in FIG. 2A are included in one wireless charging chip, data sensed by the motion sensor 259 is transferred to the at least one processor 258 (e.g., an AP), and the at least one processor 258 may transfer information related to the sensed data to the controller 252 within the wireless charging chip. The at least one processor 258 may transfer the sensed data itself to the controller 252, or may transfer, to the controller 252, a determined result of whether to move or an identified result of a movement distance based on the sensed data. According to an embodiment, data sensed by the sensor may be directly provided to the controller 252 without passing through the processor 258. According to an embodiment, the controller 252 may receive the same data as data sensed by the motion sensor 259, and may determine whether to move or identify a movement distance from the sensed data. For example, if the controller 252 receives data sensed from the motion sensor 259, the controller 252 may identify movement-related information (e.g., whether to move and a movement distance) from the sensed data. According to an embodiment, if a sensed value is greater than or equal to a threshold value, it may be determined that it has moved. In addition, the movement distance may be calculated from the sensed value based on a preset computation rule.

According to an embodiment, the controller 252 may sense an output voltage $V_{RECT}$ measured at an output terminal of the rectification circuit 254 to determine a location movement of the wireless power receiver 110, or receive a value sensed by a separately configured voltage sensor (③). The output terminal of the rectification circuit 254 is merely an example, and there is no limitation to a voltage measurement point for determining the location movement.

According to an embodiment, the controller 252 may identify whether the wireless power receiver 110 is moved, a movement distance, or a change in a location relationship between the wireless power receiver 110 and the wireless power transmitter 100 (e.g., whether the wireless power receiver 110 is closer to or farther away from the wireless power transmitter 100) at least based on movement related information which corresponds to a value sensed via the sensor (e.g., the motion sensor 259) and/or an output voltage $V_{RECT}$ measured at the output terminal of the rectification circuit 254. For example, if the controller 252 determines that the wireless power receiver 110 is moved, the controller 252 may determine that the wireless power receiver 110 is closer to the wireless power transmitter 100 when the output voltage increases, and may determine that the wireless power receiver 110 is farther away from the wireless power transmitter 100 when the output voltage decreases. The controller 252 may identify the movement distance or the change in the location relationship between the wireless power receiver 110 and the wireless power transmitter 100 based on an increased amount of the output voltage or a decreased amount of the output voltage. The controller 252 may control (④) the output of the DC/DC converter 255 (e.g., control an output voltage $V_{OUT}$ and/or an output current $I_{OUT}$) based on the movement distance or the change in the location relationship. As the output of the DC/DC converter 255 is controlled, the load impedance $Z_{OUT}$ or the reception-side rectifier impedance $Z_{RECT}$ may be changed, so an amount of a reception power may be adjusted/changed. According to various embodiments, the load impedance may refer, for example, to an impedance measured at the output terminal of the DC/DC converter 255 (e.g., $Z_{OUT}=V_{OUT}/I_{OUT}$). The reception-side rectifier impedance may refer, for example, to an impedance measured at the output terminal of the rectification circuit 254 (e.g., $Z_{RECT}=V_{RECT}/I_{RECT}$).

For example, if the controller 252 identifies that a movement of the wireless power receiver 110 occurs based on the movement related information which corresponds to the value sensed by the motion sensor 259, the controller 252 may control the output of the DC/DC converter 255 based on the output voltage $V_{RECT}$ measured at the output terminal of the rectification circuit 254. For example, the controller 252 may determine whether the wireless power receiver 110 is closer to or farther away from the wireless power transmitter 100 or whether there is no change in a location of the wireless power receiver 110 based on the output voltage $V_{RECT}$ value measured at the output terminal of the rectification circuit 254. As described above, if the distance between the wireless power receiver 110 and the wireless power transmitter 100 is changed according to the movement of the wireless power receiver 110, the transmission power of the wireless power transmitter 100 may be changed as a mutual coupling coefficient k is changed. For example, if the coupling coefficient k between the wireless power transmitter 100 and the wireless power receiver 110 is changed, an impedance at a resonator of the wireless power transmitter 100 is changed, so the transmission of the wireless power transmitter 100 and the reception power of the wireless power receiver 110 may be changed. If the wireless power transmitter 100 charges a plurality of wireless power receivers 110-1, 110-2, and 110-n, overall power transfer efficiency may be decreased according to the change in the transmission power. A more detailed description of this will be described in greater detail below with reference to FIGS. 7A, 7B, 7C, 8A, 8B, and 8C.

According to an embodiment, if it is identified that the location of the wireless power receiver 110 is changed based on the value sensed via the sensor (e.g., the motion sensor 259), and it is identified that the output voltage $V_{RECT}$ measured at the output terminal of the rectification circuit 254 is increased, the controller 252 may control the output of the DC/DC converter 255 (e.g., control the output voltage and/or the output current) to change the load impedance or the reception-side rectifier impedance. Through this, a transmission power and a reception power may be changed, and overall power transfer efficiency may be increased. For example, if it is identified that the location of the wireless power receiver 110 is changed based on the value sensed via the sensor, and the output voltage $V_{RECT}$ measured at the output terminal of the rectification circuit 254 is increased, the controller 252 may determine that the wireless power receiver 110 is closer to the wireless power transmitter 100 and control the output of the DC/DC converter 255 to change the load impedance or the reception-side rectifier impedance. According to various embodiments, the movement distance of the wireless power receiver 110 may be estimated based on an amount of increase in the output voltage $V_{RECT}$. According to various embodiments, the process of determining that the wireless power receiver 110 is closer to the wireless power transmitter 100 may be omitted, it may be implemented that the controller 252 may control the output of the DC/DC converter 255 to change the load impedance or the reception-side rectifier impedance according to whether the output voltage $V_{RECT}$ is increased, a degree to which the output voltage $V_{RECT}$ is increased, or the movement distance. According to various embodiments, the wireless power receiver 110 may store an output value (e.g., the output voltage $V_{OUT}$ or the output current $I_{OUT}$) of the DC/DC converter 255 corresponding to the output voltage $V_{RECT}$ in a memory in a form of a mapping table. If it is determined that the wireless power receiver 110 is moved, the controller 252 of the wireless power receiver 110 may identify the mapping table stored in the memory to control the DC/DC converter 255 according to the output value (e.g., the output current or the output voltage) of the DC converter 255 which corresponds to the measured output voltage $V_{RECT}$. According to various embodiments, the wireless power receiver 110 may control the output value of the DC/DC converter 255 to be changed to a specific value based on the mapping table, and then precisely adjust the load impedance or the reception-side rectifier impedance by repeatedly adjusting the output value of the DC/DC converter 255 by a unit value (e.g., 1V or 0.1 A).

According to an embodiment, the controller 252 may determine that the location of the wireless power receiver 110 is changed if the value sensed from the sensor and/or the output voltage $V_{RECT}$ measured at the output terminal of the rectification circuit 254 is changed by a set threshold value or by more than the set threshold value.

The controller 252 may increase the load impedance or the reception-side rectifier impedance of the wireless power receiver 110 by controlling the output of the DC/DC converter 255 as the wireless power receiver 110 is closer to the wireless power transmitter 100. For example, the controller 252 may increase the reception-side rectifier impedance $Z_{RECT}$ of the wireless power receiver 110 by controlling the DC/DC converter 255 (e.g., a regulator) to control the output current $I_{OUT}$ (e.g., a limitation value of the output current) of the DC/DC converter 255 to be decreased. According to an embodiment, the controller 252 may adjust a setting value for the DC/DC converter 255 (e.g., the regulator) by a control signal, and the regulator which performs a function of the DC/DC converter 255 may adjust the output voltage $V_{OUT}$ and/or the output current $I_{OUT}$ of the DC/DC converter 255 based on the control signal of the controller 252. As an implementation example of the DC/DC converter 255, an example embodiment of controlling an output voltage and/or current by adjusting a set value for a regulator (e.g., a linear regulator or a switching regulator) will be described in greater detail below with reference to FIG. 9.

According to an embodiment, if it is identified that the location of the wireless power receiver 110 is changed based on the value sensed via the sensor (e.g., the motion sensor 259), and it is identified that the output voltage $V_{RECT}$ measured at the output terminal of the rectification circuit 254 is decreased, the controller 252 may control the output of the DC/DC converter 255 (e.g., control the output voltage and/or the output current) to change the load impedance or the reception-side rectifier impedance. For example, if it is identified that the location of the wireless power receiver 110 is changed based on the value sensed via the sensor, and it is identified that the output voltage $V_{RECT}$ measured at the output terminal of the rectification circuit 254 is decreased, the controller 252 may determine that the wireless power receiver 110 is farther away from the wireless power transmitter 100 and control the output of the DC/DC converter 255 (e.g., control the output voltage and/or the output current) to change the load impedance or the reception-side rectifier impedance. According to various embodiments, the movement distance of the wireless power receiver 110 may be estimated based on an amount of decrease in the output voltage $V_{RECT}$. According to various embodiments, the process of determining that the wireless power receiver 110 is farther away from the wireless power transmitter 100 may be omitted, it may be implemented that the controller 252 may change the load impedance or the reception-side rectifier impedance according to whether the output voltage $V_{RECT}$ is decreased, a degree to which the output voltage $V_{RECT}$ is decreased, or the movement distance. According to various embodiments, the wireless power receiver 110 may store an output value (e.g., the output voltage $V_{OUT}$ or the output current $I_{OUT}$) of the DC/DC converter 255 which corresponds to the output voltage $V_{RECT}$ in a memory in a form of a mapping table. If it is determined that the wireless power receiver 110 is moved, the controller 252 may consider the mapping table stored in the memory to control the DC/DC converter 255 based on the output value of the DC converter 255 which corresponds to the measured output voltage $V_{RECT}$. According to various embodiments, the wireless power receiver 110 may control the output value of the DC/DC converter 255 to be changed to a specific value based on the mapping table, and then precisely adjust the load impedance or the reception-side rectifier impedance by repeatedly adjusting the output value of the DC/DC converter 255 by a unit value (e.g., 1V or 0.1 A).

According to an embodiment, the controller 252 may determine that the location of the wireless power receiver 110 is changed if the value sensed from the sensor and/or the output voltage $V_{RECT}$ measured at the output terminal of the rectification circuit 254 is changed by a threshold value or by more than the threshold value.

The controller 252 may decrease the load impedance or the reception-side rectifier impedance of the wireless power receiver 110 by controlling the output of the DC/DC converter 255 as the wireless power receiver 110 is farther away from the wireless power transmitter 100. For example, the controller 252 may decrease the reception-side rectifier impedance $Z_{RECT}$ of the wireless power receiver 110 by controlling the DC/DC converter 255 (e.g., a regulator) to control the output current $I_{OUT}$ (e.g., a limitation value of the output current) of the DC/DC converter 255 to be increased. According to an embodiment, the controller 252 may adjust a setting value for the DC/DC converter 255 (e.g., the regulator) by a control signal, and the regulator which performs a function of the DC/DC converter 255 may control the output voltage \Tom' and/or the output current $I_{OUT}$ of the DC/DC converter 255 based on the control signal of the controller 252 to change the load impedance or the reception-side rectifier impedance. As an implementation example of the DC/DC converter 255, a specific embodiment of adjusting an output voltage and/or current by controlling a set value for a regulator (e.g., a linear regulator or a switching regulator) will be described in greater detail below with reference to FIG. 9.

According to an embodiment, the wireless power receiver 110 may transmit (⑤), to the wireless power transmitter 100 via the communication unit 253, information related to a location movement indicating that a location of the wireless power receiver 110 is changed. The information related to the location movement may include information related to whether the location of the wireless power receiver 110 is moved. The information related to whether the location of the wireless power receiver 110 is moved may include information (e.g., information related to a change in a location relationship) indicating that the wireless power receiver 110 is closer to the wireless power transmitter 100 or farther away from the wireless power transmitter 100, and/or information related to a movement distance.

According to an embodiment, if the wireless power transmitter 100 and the wireless power receiver 110 transmit and receive a wireless power in a manner defined, for example, in Alliance for Wireless Power (A4WP) standard (or air fuel alliance (AFA) standard), the wireless power receiver 110 may include the information related to the location movement in a message defined in the standard and transmit the message to the wireless power transmitter 100. For example, the wireless power receiver 110 may include the information related to the location movement in an RFU field of a PRU dynamic message defined in the A4WP standard (or the AFA standard) as shown in Table 1 below and transmit the PRU dynamic message.

TABLE 1

| Field | Octets | Description | Use | Units |
|---|---|---|---|---|
| Optional fields validity | 1 | Defines which optional fields are populated | Mandatory | |
| $V_{RECT}$ | 2 | DC voltage at the output of the rectifier. | Mandatory | mV |
| $I_{RECT}$ | 2 | DC current at the output of the rectifier. | Mandatory | mA |
| $V_{OUT}$ | 2 | Voltage at charge/battery port | Optional | mV |
| $I_{OUT}$ | 2 | Current at charge/battery port | Optional | mA |
| $T_{RATIO}$ | 1 | Current temperature of PRU relative to its OTP temperature | Optional | Bit field |
| $V_{RECT\_MIN\_DYN}$ | 2 | The current dynamic minimum rectifier voltage desired | Optional | mV |
| $V_{RECT\_SET\_DYN}$ | 2 | Desired $V_{RECT}$ (dynamic value) | Optional | mV |
| $V_{RECT\_HIGH\_DYN}$ | 2 | The current dynamic maximum rectifier voltage desired | Optional | mV |
| PRU alert | 1 | Warnings | Mandatory | Bit field |
| Tester command | 1 | PTU Test Mode Command | Optional | Bit field |
| Dyn PRU Info | 1 | Dynamic PRU Information | Optional | Bit field |
| RFU | 1 | Undefined | | |

According to an embodiment, the controller 252 may be implemented in a form of one chip. According to an embodiment, the controller 252 may be configured to include the rectification circuit 254 and the DC/DC converter 255 in one chip. According to various embodiments, the controller 252 may be implemented with the communication unit 253 in a form of one chip. Referring to FIG. 2B, the controller 252 in FIG. 2A may be omitted, and at least some of functions performed in the controller 252 may be performed in the processor 258.

The at least some functions of the controller 252 may be performed in a controller included in the one chip, and as described above, at least some other functions of the controller 252 may be distributed to the processor 258 and performed in the processor 258. Accordingly, an implementation scheme for the controller 252 may be implemented in various hardware or software forms, and as described above, at least some functions may be distributed to different chips or different modules and performed in the different chips or different modules, respectively.

Figure 3:
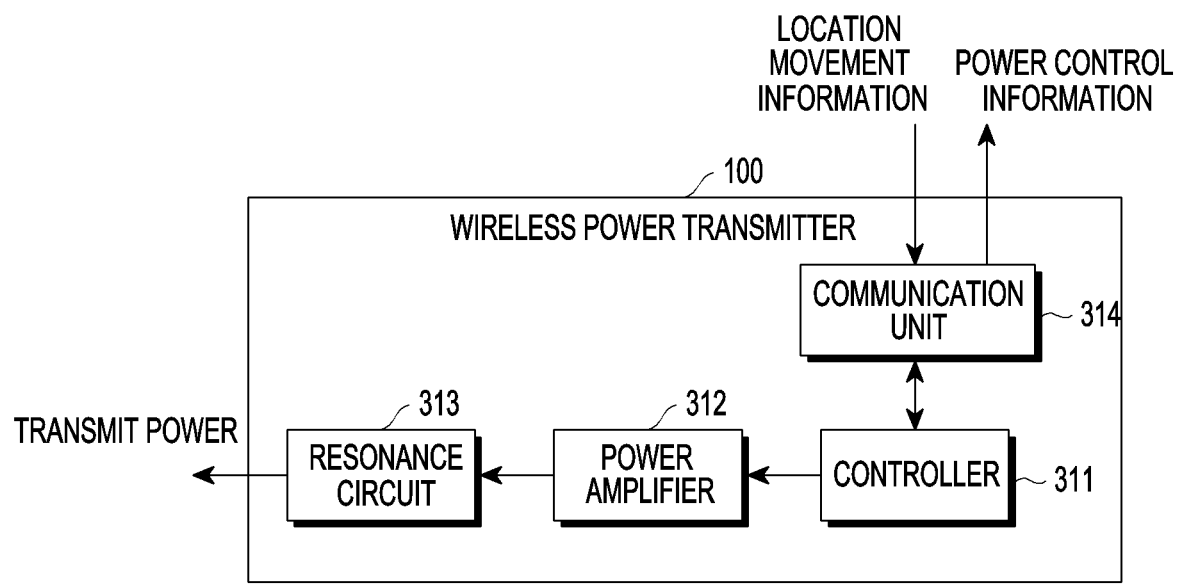
FIG. 3 is a block diagram illustrating an example wireless power transmitter according to various embodiments.

FIG. 3 is a block diagram illustrating an example wireless power transmitter according to various embodiments.

As described in FIG. 3, a wireless power transmitter 100 may include a controller (e.g., including control or processing circuitry) 311, a power amplifier (PA) 312, a resonance circuit (or a resonator) 313, and a communication unit (e.g., including communication circuitry) 314.

The resonance circuit 313 may provide a power required by the wireless power transmitter 100 or a wireless power receiver 110, and may wirelessly provide at least one wireless power receiver 110 with a power. The resonance circuit 313 may provide a power in a form of an AC waveform. Further, the resonance circuit 313 may provide a power in a form of a DC waveform, and convert the power of the DC waveform into a power of the AC waveform using an inverter to provide the power of the AC waveform. The wireless power transmitter 100 may receive a power from an embedded battery or an external device, amplify the received power via the PA 312, and transmit the amplified power to the wireless power receiver 110 via the resonance circuit 313. It will be readily understood by those skilled in the art that the resonance circuit 313 is not limited as long as it is capable of providing a power of a constant AC waveform.

Figure 5A:
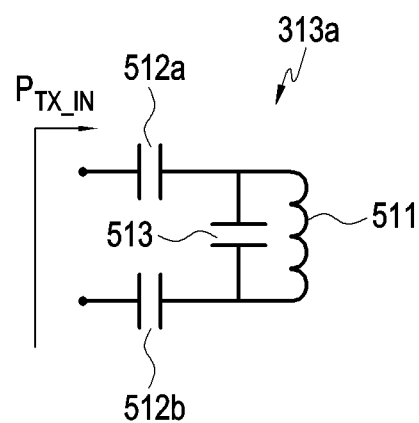
FIG. 5A is a diagram illustrating an example serial-type resonance circuit according to various embodiments.
Figure 6A:
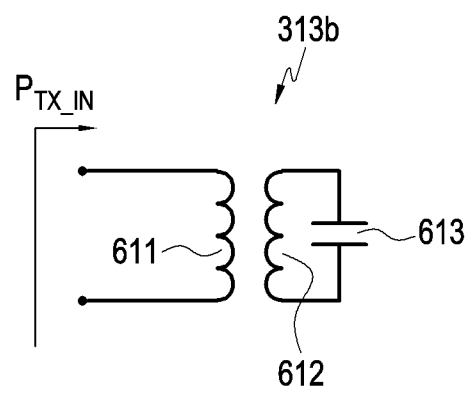
FIG. 6A is a diagram illustrating an example parallel-type resonance circuit according to various embodiments.

The resonance circuit 313 may input an AC current and output, transmit, or provide a power in a form of an electromagnetic field to the at least one wireless power receiver 110. A resonance circuit 251 of the wireless power receiver 110 illustrated in FIGS. 2A and 2B may receive a power based on an electromagnetic field output via the resonance circuit 313 of the wireless power transmitter 100. An inductance L of a loop coil of the resonance circuit 313 may be changed. According to various embodiments, the resonance circuit 313 may be configured in a form of a serial resonance as shown in FIG. 5A, or may be configured in a form of a parallel resonance as shown in FIG. 6A. For example, it will be readily understood by those skilled in the art that the resonance circuit 313 is not limited as long as it is capable of transmitting and receiving a power based on an electromagnetic field.

The controller 311 may include various processing or control circuitry and control an overall operation of the wireless power transmitter 100. The controller 311 may control the overall operation of the wireless power transmitter 100 using an algorithm, a program, or an application required for control which is read from a storage unit (not shown). The controller 311 may be implemented in a form such as, for example, and without limitation, a CPU, a microprocessor, or the like.

The communication unit 314 may include various communication circuitry and communicate with the wireless power receiver 110 in a predetermined manner. The communication unit 314 may communicate with a communication unit 253 of the wireless power receiver 110 using a near field communication (NFC) scheme, a Zigbee communication scheme, an infrared communication scheme, a visible light communication scheme, a Bluetooth communication scheme, a bluetooth low energy (BLE) scheme, a WiFi scheme, a WiFi direct scheme, and/or the like. The communication unit 314 may use a carrier sense multiple access with collision avoidance (CSMA/CA) algorithm. Meanwhile, the above-described communication scheme is merely an example, and a scope of embodiments of the present disclosure is not limited to a specific communication scheme performed by the communication unit 314.

According to various embodiments, the communication unit 314 may transmit a signal for information of the wireless power transmitter 100. The communication unit 314 may, for example, unicast, multicast, or broadcast the signal.

The communication unit 314 may receive power information from the wireless power receiver 110. The power information may include at least one of a capacity of the wireless power receiver 110, a remaining amount of a battery, the number of times of charging, a usage amount, a capacity of the battery, a battery ratio, or information related to a location movement (e.g., a movement distance or a change in a location relationship).

The communication unit 314 may transmit a charging function control signal for controlling a charging function of the wireless power receiver 110. The charging function control signal may be a control signal for controlling at least one of the resonance circuit 251, a rectification circuit 254, a DC/DC converter 255, and a charging control circuit 256 of a specific wireless power receiver 110 to enable or disable the charging function. According to various embodiments, the communication unit 314 may transmit a message including a power control instruction to the wireless power receiver 110. The power control instruction is an instruction which causes the specific wireless power receiver 110 to control an output (e.g., an output voltage or an output current) of the DC/DC converter 255, and a load impedance $Z_{OUT}$ or a reception-side rectifier impedance $Z_{RECT}$ may be changed as the output of the DC/DC converter 255 is controlled.

Although the resonance circuit 313 and the communication unit 314 are implemented as different hardware and the wireless power transmitter 100 communicates in an out-band (or out of band) form in FIG. 3, this is merely an example. For example, in various embodiments of the present disclosure, the resonance circuit 313 and the communication unit 314 may be implemented as one hardware and the wireless power transmitter 100 may perform a communication in an in-band form.

The wireless power transmitter 100 and the wireless power receiver 110 may transmit and receive various signals, and accordingly, a subscription of the wireless power receiver 110 to a wireless power network managed by the wireless power transmitter 100 and a charging process through wireless power transmission/reception may be performed.

The wireless power transmitter 100 illustrated in FIG. 3 may further include a driving circuit (or a driver) (not shown) and a matching circuit (not shown). The driving circuit may output a DC power having a preset voltage value. The voltage value of the DC power output from the driving circuit may be controlled by the controller 311. A DC current output from the driving circuit may be output to the PA 312. The PA 312 may amplify the DC current with a preset gain. The PA 312 may convert a DC power into an AC based on a control signal input from the controller 311. Accordingly, the PA 312 may output an AC power.

The AC power output from the PA 312 may be transferred to the resonance circuit 313 through the matching circuit. The matching circuit may control an output power to have high-efficiency or high-output by adjusting a transmission-side resonator impedance. The matching circuit may adjust the transmission-side resonator impedance based on a control of the controller 311. The matching circuit may include at least one of a coil and a capacitor. The controller 311 may control a connection state with at least one of the coil and the capacitor, and accordingly may perform impedance matching.

The resonance circuit 313 may transmit an input AC power to the resonance circuit 251 of the wireless power receiver 110. The resonance circuit 313 of the wireless power transmitter 100 and the resonance circuit 251 of the wireless power receiver 110 may be implemented as a resonance circuit having the same resonance frequency. For example, a resonance frequency may be determined to be 6.78 MHz.

The communication unit 314 may include various communication circuitry and perform a communication with the communication unit 253 of the wireless power receiver 110, for example, perform a communication (WiFi, ZigBee, and BT/BLE) at a bidirectional 2.4 GHz frequency or a 5 GHz frequency. As described above, FIGS. 2A and 2B illustrate a structure of a wireless power receiver, and FIG. 3 illustrates a structure of a wireless power transmitter, however, according to various embodiments, all components in FIG. 2A or FIG. 2B, and FIG. 3 may be included in one electronic device. For example, the resonance circuit 251 of the wireless power receiver 110 in FIGS. 2A and 2B may be used as the resonance circuit 313 of the wireless power transmitter 100 in FIG. 3, and the rectification circuit 254 in FIGS. 2A and 2B may also be used as the PA 312 in FIG. 3.

An electronic device (e.g., a wireless power receiver) according various example embodiments may comprise: a sensor, a battery, a resonance circuit configured to wirelessly receive power, a rectification circuit configured to rectify an AC power provided from the resonance circuit into a DC power, a DC/DC converter configured to convert the DC power provided from the rectification circuit to output a converted power, a charging control circuit configured to charge the battery using the converted power provided from the DC/DC converter, and a controller, wherein the controller may be configured to: identify movement information of the electronic device corresponding to a value sensed via the sensor, identify a voltage value of the DC power rectified via the rectification circuit, and control an output of the DC/DC converter based on the movement information and the voltage value.

According to various example embodiments, controlling the output of the DC/DC converter may include controlling at least one of an output voltage or an output current of the DC/DC converter.

According to various example embodiments, the controller may be configured to control the output of the DC/DC converter such that an impedance of a rear end of the rectification circuit increases based on the voltage value of the DC power increasing.

According to various example embodiments, the DC/DC converter may include a linear regulator, and the controller may be configured to control the linear regulator to decrease an output current of the DC/DC converter based on the voltage value of the DC power increasing.

According to various example embodiments, the DC/DC converter may include a switching regulator, and the controller may be configured to control the switching regulator to decrease at least one of an output voltage or an output current of the DC/DC converter based on the voltage value of the DC power increasing.

According to various example embodiments, the controller may be configured to control the output of the DC/DC converter such that an impedance of a rear end of the rectification circuit decreases based on the voltage value of the DC power decreasing.

According to various example embodiments, the DC/DC converter may include a linear regulator, and the controller may be configured to control the linear regulator to decrease an output voltage of the DC/DC converter based on the voltage value of the DC power decreasing.

According to various example embodiments, the DC/DC converter may include a switching regulator, and the controller may be configured to control the switching regulator to increase at least one of an output voltage or an output current of the DC/DC converter based on the voltage value of the DC power decreasing.

According to various example embodiments, the electronic device may further comprise a communication circuit, and the controller may be configured to: generate information related to location movement based on an identified result of the voltage value of the DC power rectified via the rectification circuit and the value sensed via the sensor, and control the generated information related to the location movement to be transmitted via the communication circuit.

According to various example embodiments, the information related to the location movement may include at least one of information indicating that a location of the electronic device is closer to a wireless power transmitter than a specified distance or farther away from the wireless power transmitter than a specified distance, or information related to a movement distance.

According to various example embodiments, the information related to the location movement may be included in a PRU dynamic message and transmitted.

According to various example embodiments, the controller may be configured to determine that a location of the electronic device is closer to a wireless power transmitter than a specified or previous distance based on the voltage value of the DC power increasing.

According to various example embodiments, the controller may be configured to determine that a location of the electronic device is farther away from a wireless power transmitter than a specified or previous distance based on the voltage value of the DC power decreasing.

Hereinafter, a serial-type resonance circuit will be described as an example embodiment of a resonance circuit 313 included in a wireless power transmitter 100 with reference to FIGS. 5A, 5B, and 5C, and a parallel-type resonance circuit will be described as an example embodiment of the resonance circuit 313 included in the wireless power transmitter 100 with reference to FIGS. 6A, 6B, and 6C. The resonance circuit 313 of the wireless power transmitter 100 according to an embodiment of the present disclosure is not limited to two schemes to be described below, and may be modified in various forms.

FIG. 5A is a diagram illustrating an example of a serial-type resonance circuit according to various embodiments, and FIG. 6A is a diagram illustrating an example of a parallel-type resonance circuit according to various embodiments. Referring to FIGS. 5A and 6A, a resonance circuit 313 of a wireless power transmitter 100 may be implemented as a serial-type resonance circuit 313a as shown in FIG. 5A, or a parallel-type resonance circuit 313b as shown in FIG. 6A.

Referring to FIG. 5A, the serial-type resonance circuit 313a may be connected to at least one first capacitor 512a or 512b and a coil 511 in serial. According to an embodiment, a second capacitor 513 may be connected to the coil 511 in parallel.

A power of $P_{TX\_IN}$ may be provided to an input terminal of the resonance circuit 313a. An impedance $Z_{TX\_IN} = V_{TX\_IN}/I_{TX\_IN}$ may be measured from a voltage $V_{TX\_IN}$ and a current $I_{TX\_IN}$ which are measured at the input terminal of the resonance circuit 313a, and the impedance will be referred to as 'transmission-side resonator impedance' for convenience of a description. At least a portion of the power $P_{TX\_IN}$ provided to the input terminal of the resonance circuit 313a may be transferred to a wireless power receiver 110 through the coil 511.

As described in FIGS. 4A and 4B, if a distance between the wireless power receiver 110 and the wireless power transmitter 100 is changed according to a movement of the wireless power receiver 110, as a coupling coefficient k between each other is changed, a transmission power of the wireless power transmitter 100 may be changed. For example, if the distance between the wireless power receiver 110 and the wireless power transmitter 100 is shorter, the coupling coefficient k between the wireless power receiver 110 and the wireless power transmitter 100 may increase.

According to various embodiments, if the wireless power transmitter 100 operates in a constant current (CC) mode, a transmission power of the wireless power transmitter 100 may be changed. According to an embodiment, if the serial-type resonance circuit 313a is used as shown in FIG. 5A, when the coupling coefficient k increases as the distance between the wireless power transmitter 100 and the wireless power receiver 110 is shorter, the transmitting-side resonator impedance of the wireless power transmitter 100 may increase. If the wireless power transmitter 100 operates in the CC mode, the transmission power $P_{TX\_IN}$ provided to the input terminal of the resonance circuit 313a may increase.

Figure 5B:
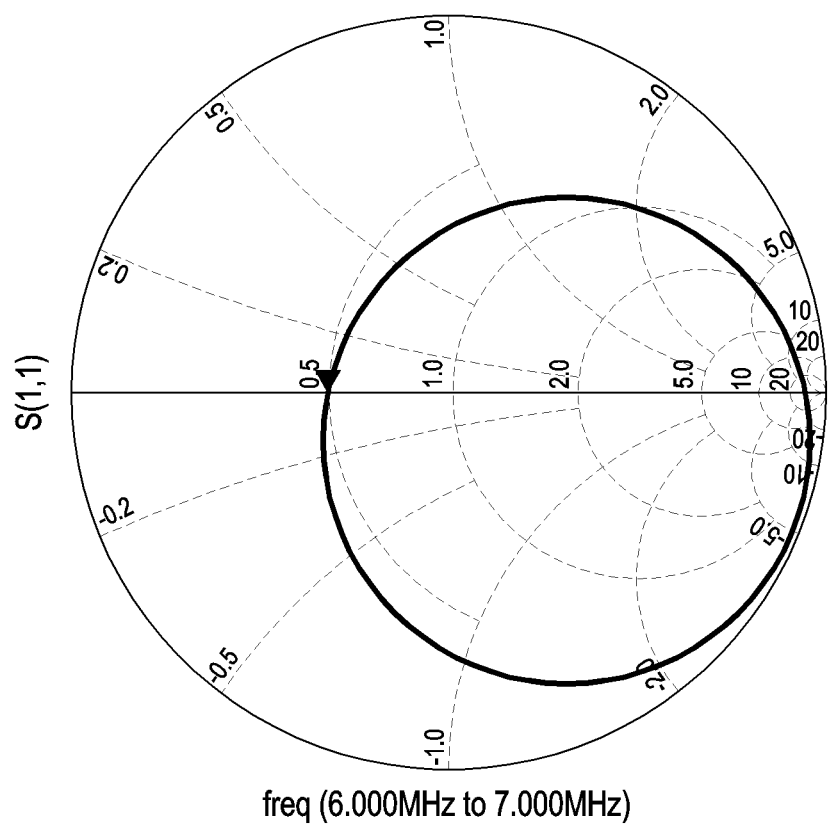
FIGS. 5B and 5C are diagrams illustrating examples of a change in a transmission-side resonator impedance in a serial-type resonance circuit according to various embodiments.
Figure 5C:
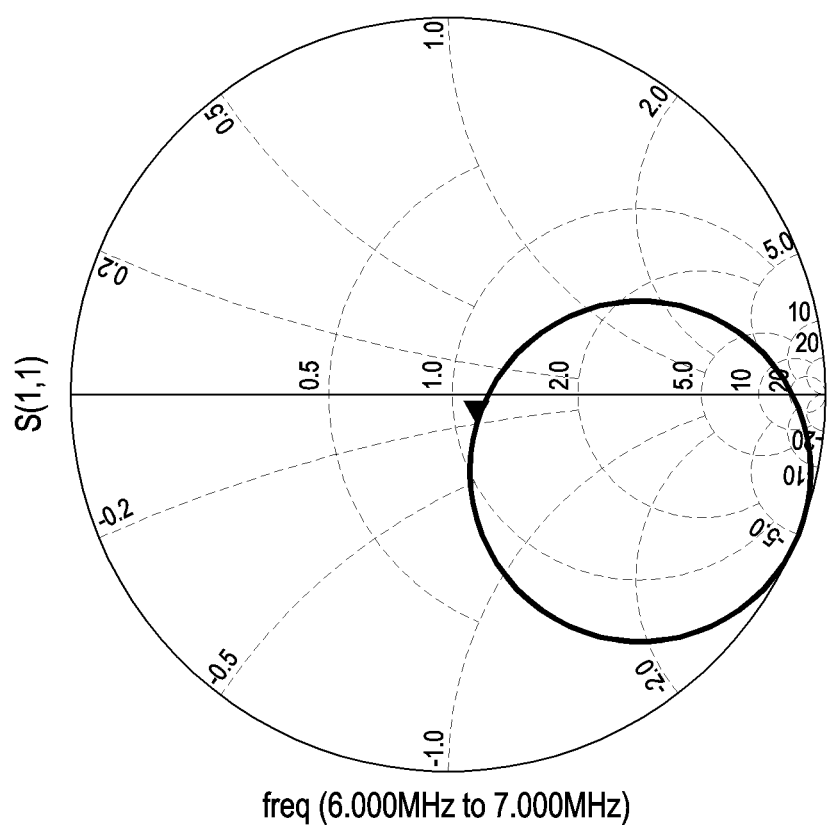

For example, referring to FIG. 5B, if an AC power of 6.78 MHz is applied to the serial-type resonance circuit 313a while the wireless power receiver 110 is disposed in a first location, the transmitting-side resonator impedance may be measured as 24.601+j0.267 as shown by a triangle in FIG. 5B. If the location of the wireless power receiver 110 is closer to the wireless power transmitter 100 before a movement as the wireless power receiver 110 moves from the first location to a second location, the transmitting-side resonator impedance may be changed to 57.635-j9.923 as shown by a triangle in FIG. 5C. For example, if the serial-type resonance circuit 313a is used, when the coupling coefficient k increases as the distance between the wireless power transmitter 100 and the wireless power receiver 110 is shorter, a magnitude of the transmitting-side resonator impedance of the wireless power transmitter 100 may increase. As described above, if the wireless power transmitter 100 operates in the CC mode, when the voltage $V_{TX\_IN}$ increases as the magnitude of the transmitting-side resonator impedance increases, the transmission power $P_{TX\_IN}$ provided to the input terminal of the resonance circuit 313a may increase. Conversely, in the serial-type resonance circuit 313a, if the coupling coefficient k decreases as the distance between the wireless power transmitter 100 and the wireless power receiver 110 is longer, the magnitude of the transmitting-side resonator impedance of the wireless power transmitter 100 may decrease.

According to various embodiments, in a situation in which the wireless power transmitter 100 charges a plurality of wireless power receivers 110-1, 110-2, and 110-n, if the transmission power $P_{TX\_IN}$ of the wireless power transmitter 100 is changed (e.g., if the transmission power is increased or decreased), overall power transfer efficiency for each wireless power receiver may decrease. For example, if the transmission power of the wireless power transmitter 100 is changed according to a location movement of a first wireless power receiver 110-1, a second wireless power receiver 110-2 may not receive a desired power. An experimental example thereof will be described in greater detail below with reference to FIGS. 7A, 7B, 7C, and 7D.

Referring to FIG. 6A, a parallel-type resonance circuit 313b may include at least one primary coil 611, a secondary coil 612, and a capacitor 613. The primary coil 611 may be referred to as a feeding coil, and the secondary coil 612 may be referred to as a transmission resonance coil. The parallel-type resonance circuit 313b may refer to a structure in which the secondary coil 612 and the capacitor 613 are connected in parallel.

A power of $P_{TX\_IN}$ may be provided to an input terminal of the primary coil 611 of the resonance circuit 313b. An impedance $Z_{TX\_IN}$ may be measured from a voltage $V_{TX\_IN}$ and a current $I_{TX\_IN}$ which are measured at the input terminal of the resonance circuit 313b, and the impedance will be referred to as 'transmission-side resonator impedance' for convenience of description. The power $P_{TX\_IN}$ provided to the input terminal of the resonance circuit 313b may be transferred to a wireless power receiver 110 through the coil 612.

As described in FIGS. 4A and 4B, if a distance between the wireless power receiver 110 and the wireless power transmitter 100 is changed according to a movement of the wireless power receiver 110, as a coupling coefficient k between each other is changed, a transmission power of the wireless power transmitter 100 may be changed. For example, if the distance between the wireless power receiver 110 and the wireless power transmitter 100 is shorter, the coupling coefficient k between the wireless power receiver 110 and the wireless power transmitter 100 may increase. According to an embodiment, if the parallel-type resonance circuit 313b is used as shown in FIG. 6A, when the coupling coefficient k increases as the distance between the wireless power transmitter 100 and the wireless power receiver 110 is shorter, a magnitude of the transmitting-side resonator impedance of the wireless power transmitter 100 may decrease. As the magnitude of the transmitting-side resonator impedance of the wireless power transmitter 100 decreases, the transmission power $P_{TX\_IN}$ provided to the input terminal of the resonance circuit 313b may decrease.

Figure 6B:
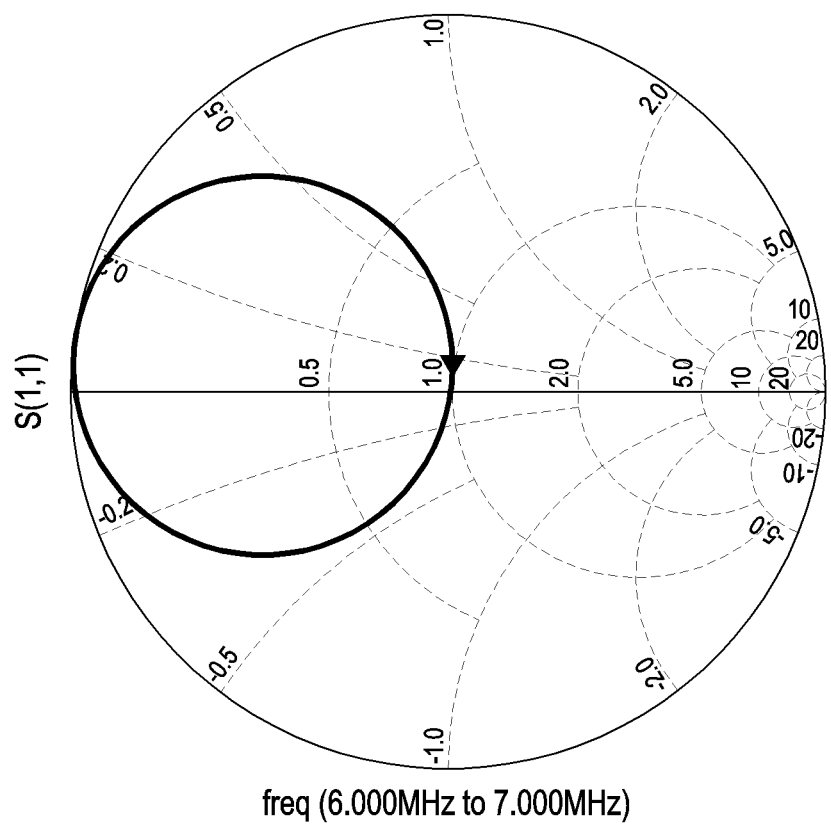
FIGS. 6B and 6C are diagrams illustrating an example of a change in a transmission-side resonator impedance in a parallel-type resonance circuit according to various embodiments.
Figure 6C:
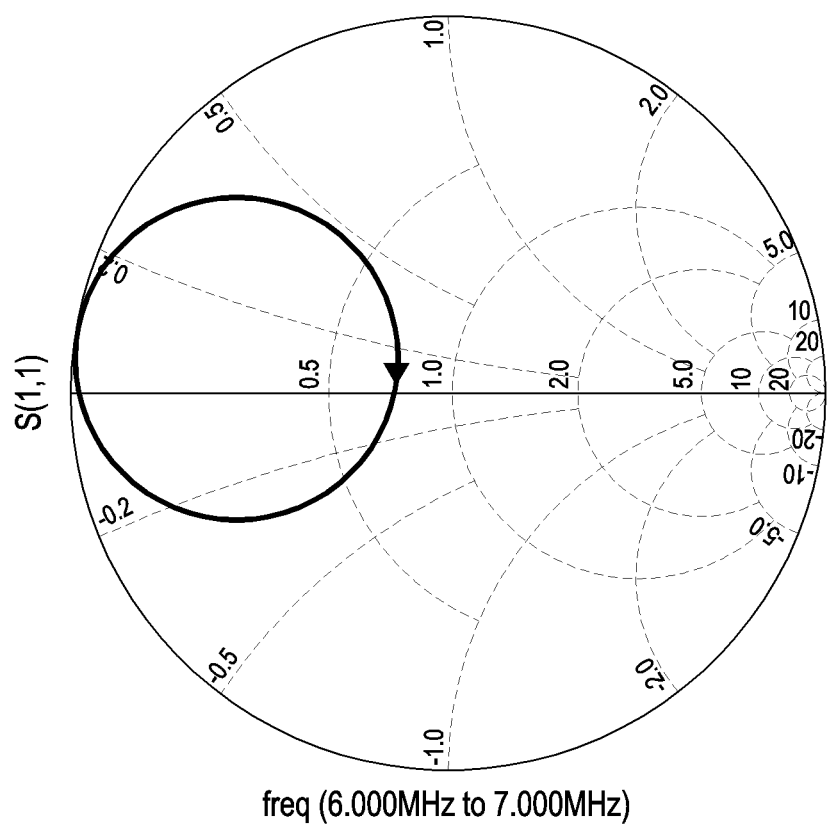

For example, referring to FIG. 6B, if an AC power of 6.78 MHz is applied to the parallel-type resonance circuit 313b while the wireless power receiver 110 is disposed in a first location, the transmitting-side resonator impedance may be measured as 49.178+j2.016 as shown by a triangle in FIG. 6B. If the location of the wireless power receiver 110 is closer to the wireless power transmitter 100 as the wireless power receiver 110 moves from the first location to a second location, the transmitting-side resonator impedance may be changed to 36.817+j2.164 as shown by a triangle in FIG. 6C. For example, if the parallel-type resonance circuit 313b is used, when the coupling coefficient k increases as the distance between the wireless power transmitter 100 and the wireless power receiver 110 is shorter, a magnitude of the transmitting-side resonator impedance of the wireless power transmitter 100 may decrease. As described above, if the voltage $V_{TX\_IN}$ decreases as the magnitude of the transmitting-side resonator impedance decreases, the transmission power $P_{TX\_IN}$ provided to the input terminal of the resonance circuit 313b may decrease. Conversely, in the parallel-type resonance circuit 313b, if the coupling coefficient k decreases as the distance between the wireless power transmitter 100 and the wireless power receiver 110 is longer, the magnitude of the transmitting-side resonator impedance of the wireless power transmitter 100 may increase.

According to various embodiments, in a situation in which the wireless power transmitter 100 charges a plurality of wireless power receivers 110-1, 110-2, and 110-n, if the transmission power $P_{TX\_IN}$ of the wireless power transmitter 100 is changed (e.g., if the transmission power is decreased or increased), overall power transfer efficiency for each wireless power receiver may decrease. For example, if the transmission power of the wireless power transmitter 100 is changed according to a location movement of a first wireless power receiver 110-1, a second wireless power receiver 110-2 may not receive a desired power. A detailed experimental example thereof will be described in greater detail below with reference to FIGS. 8A, 8B, 8C, and 8D.

Hereinafter, an experimental result in a serial-type resonance circuit in FIG. 5A will be described with reference to FIGS. 7A, 7B, 7C, and 7D, and an experimental result in a parallel-type resonance circuit in FIG. 6A will be described with reference to FIGS. 8A, 8B, 8C, and 8D.

Figure 7B:
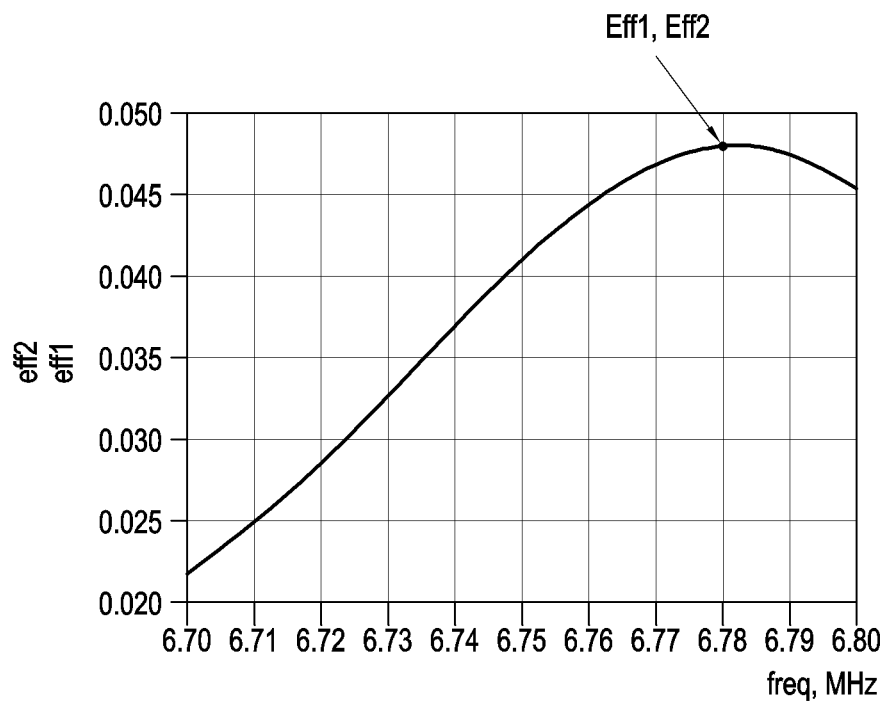
Figure 7B:
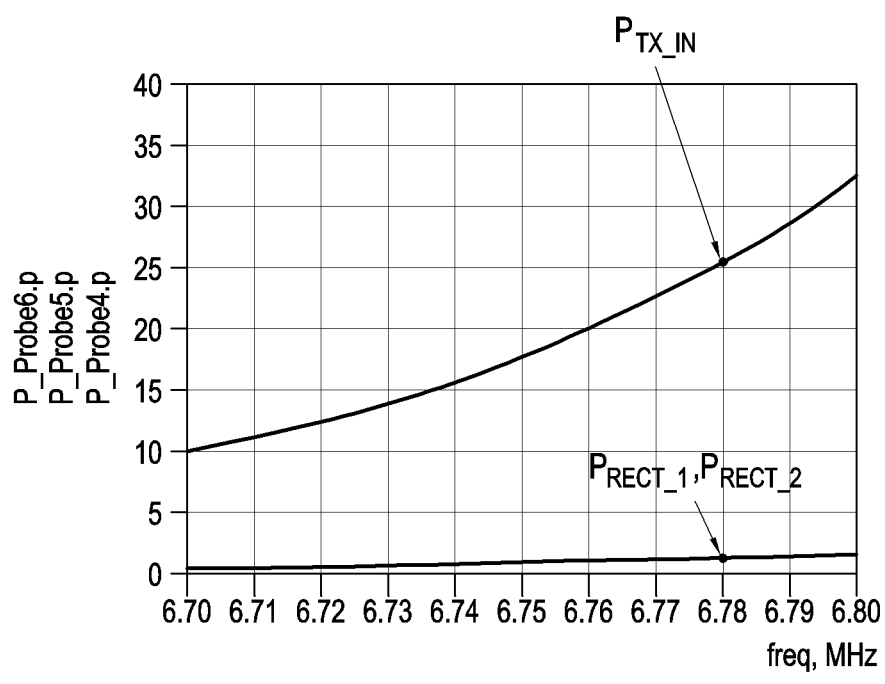
Figure 7C:
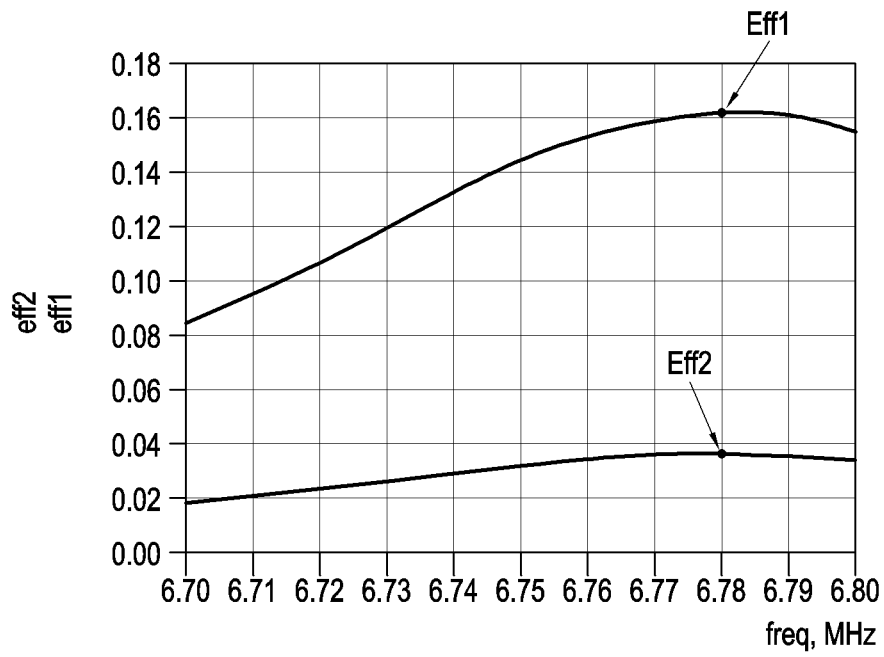
Figure 7C:
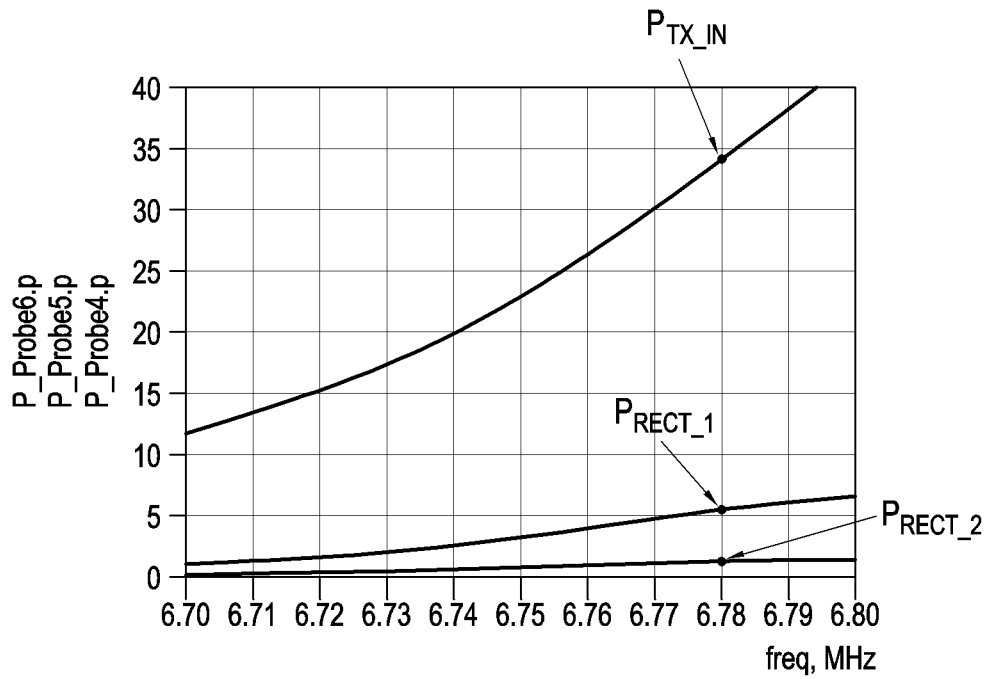
Figure 7D:
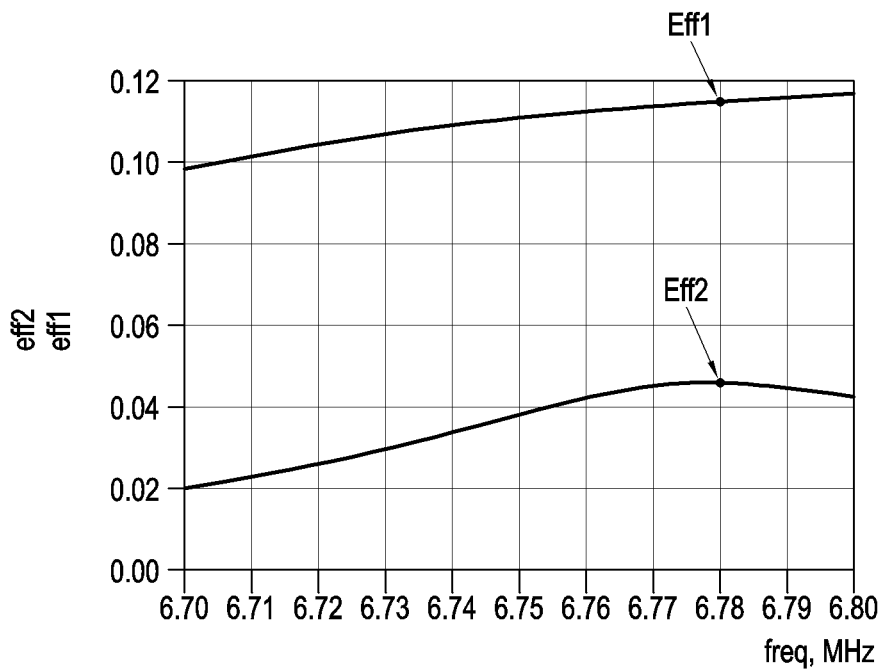
Figure 7D:
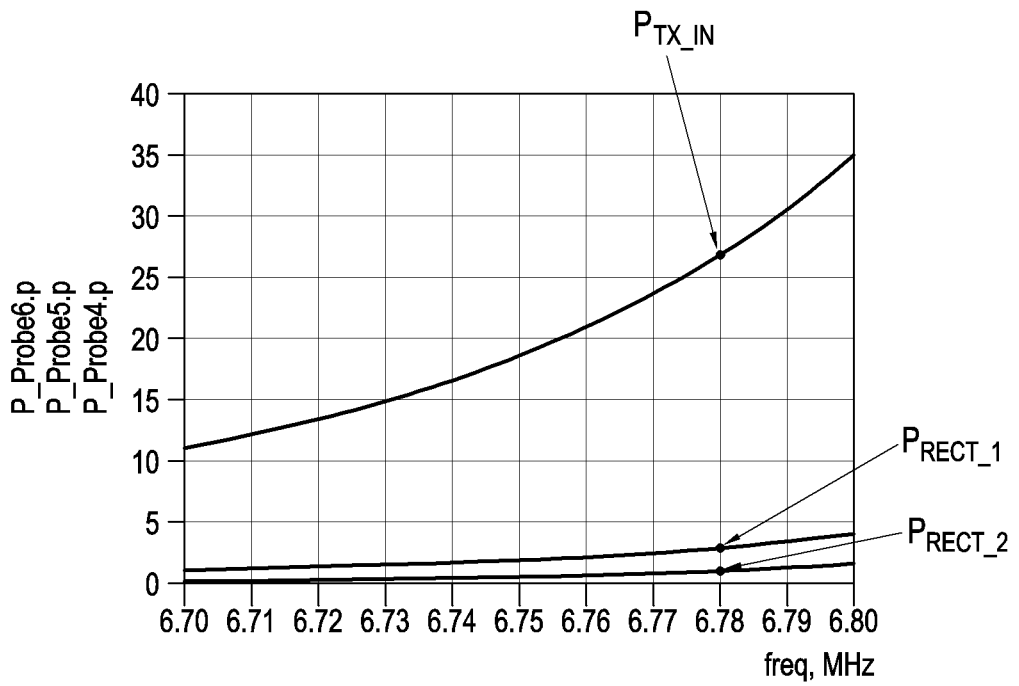

FIGS. 7A, 7B, 7C, and 7D are diagrams illustrating an example experimental result in a serial-type resonance circuit according to various embodiments. Referring to FIG. 7A, it will be assumed that a wireless power transmitter 100 including a serial-type resonance circuit 313a charges a plurality of wireless power receivers 110-1, 110-2, and 110-n (e.g., a first wireless power receiver 110-1 and a second wireless power 110-2). It may be assumed that a distance between the wireless power transmitter 100 and the first wireless power receiver 110-1 is the same as a distance between the wireless power transmitter 100 and the second wireless power receiver 110-2, but is not limited thereto. It may be assumed that a reception-side rectifier impedance $R_L^1$ of the first wireless power receiver 110-1 and a reception-side rectifier impedance $R_L^2$ of the second wireless power receiver 110-2 are the same each other and 5 ohms (a), for a reception-side rectifier impedance $Z_{RECT}$ of each wireless power receiver 110, but is not limited thereto.

For example, if a distance between the first wireless power receiver 110-1 and the wireless power transmitter 100 and a distance between the second wireless power receiver 110-2 and the wireless power transmitter 100 are the same, and a reception-side rectifier impedance of the first wireless power receiver 110-1 and a reception-side rectifier impedance of the second wireless power receiver 110-2 are the same, it may be assumed that a coupling coefficient $k_1$ between the wireless power transmitter 100 and the first wireless power receiver 110-1 and a coupling coefficient $k_2$ between the wireless power transmitter 100 and the second wireless power receiver 110-2 are the same each other and 0.00236. In the assumed situation, as shown in (b) of FIG. 7B, a transmission power $P_{TX\_IN}$ of the wireless power transmitter 100 is 25.585 W, a reception power $P_{RECT\_1}$ measured at a rear end of a rectification circuit of the first wireless power receiver 110-1 is 1.227 W, and a reception power $P_{RECT\_2}$ measured at a rear end of a rectification circuit of the second wireless power receiver 110-2 is 1.227 W. As shown in (a) of FIG. 7B, from the measured values, power transfer efficiency Eff.1 of the first wireless power receiver 110-1 may be calculated as Eff.1=$P_{RECT\_1}/P_{TX\_IN}$ which is 0.048, and power transfer efficiency Eff.2 of the second wireless power receiver 110-2 may be calculated as Eff.2=$P_{RECT\_2}/P_{TX\_IN}$ which is 0.48 and the same value as Eff.1.

According to various embodiments, if the first wireless power receiver 110-1 moves from a first location to a second location and is closer to the wireless power transmitter 100 than before the movement, the coupling coefficient $k_1$ between the first wireless power receiver 110-1 and the wireless power transmitter 100 may increase from 0.00236 to 0.005. If a resonance circuit 313 of the wireless power transmitter 100 is the serial-type resonance circuit 313a, as described above, as the coupling coefficient $k_1$ increases, a transmission-side resonator impedance increases, so the transmission power $P_{TX\_IN}$ of the wireless power transmitter 100 may increase from 25.585 W to 34.057 W as shown in (b) of FIG. 7C. Accordingly, a reception power $P_{RECT\_1}$ (e.g., a reception power measured at a rear end of a rectification circuit) of the first wireless power receiver 110-1 may increase from 1.227 W to 5.495 W as shown in (b) of FIG. 7C. On the other hand, a reception power $P_{RECT\_2}$ (e.g., a reception power measured at a rear end of a rectification circuit) of the second wireless power receiver 110-2 may decrease from 1.227 W to 1.224 W as shown in (b) of FIG. 7C. According to a location movement of the first wireless power receiver 110-1, the power transfer efficiency Eff.1 of the first wireless power receiver 110-1 may increase from 0.048 to 0.161 as shown in (a) of FIG. 7C, while the power transfer efficiency Eff.2 of the second wireless power receiver 110-2 may decrease from 0.048 to 0.036 as shown in (a) of FIG. 7C.

As described above, if the coupling coefficient $k_1$ increases (for example, in a case of a strongly coupled state) as coupling between the first wireless power receiver 110-1 and the wireless power transmitter 100 is stronger according to the location movement of the first wireless power receiver 110-1, a problem that the power transfer efficiency of the second wireless power receiver 110-2 decreases may occur and an overload problem due to an increase in transmission of the wireless power transmitter 100 may occur.

In various embodiments of the present disclosure, as described above, if the coupling coefficient $k_1$ increases as the coupling between the first wireless power receiver 110-1 and the wireless power transmitter 100 is stronger according to the location movement of the first wireless power receiver 110-1, a problem that the power transfer efficiency of the second wireless power receiver 110-2 decreases may be addressed and an overload of the wireless power transmitter 100 may be prevented and/or reduced by controlling an output of a DC/DC converter 255 of the first wireless power receiver 110-1 whose location is moved to adjust an impedance (e.g., a load impedance or a reception-side rectifier impedance). According to various embodiments, a reception-side rectifier impedance may be increased by adjusting the output (e.g., an output voltage or an output current) of the DC/DC converter 255 of the first wireless power receiver 110-1 whose location is moved to adjust a load impedance. Various embodiments of a method of increasing the reception-side rectifier impedance by adjusting the load impedance will be described in greater detail below with reference to FIG. 9.

For example, as shown in FIG. 7A, if the distance between the first wireless power receiver 110-1 and the wireless power transmitter 100 is shorter according to the location movement of the first wireless power receiver 110-1, the first wireless power receiver 110-1 may increase the reception-side rectifier impedance $R_L^1$ by a set value. For example, as shown in Table 2 to be described later, if a coupling coefficient is doubled, the reception-side rectifier impedance $R_L^1$ may be increased from 5Ω to 25Ω. As the reception-side rectifier impedance $R_L^1$ of the first wireless power receiver 110-1 is increased from 5Ω to 25Ω, the transmission power of the wireless power transmitter 100 may be decreased from 34.057 W to 26.838 W, that is, a degree to which the transmission power of the wireless power transmitter 100 is increased may be mitigated, as shown in (b) of FIG. 7D. As the transmission power of the wireless power transmitter 100 is decreased from 34.057 W to 26.838 W, the power transfer efficiency Eff.2 of the second wireless power receiver 110-1 may be increased from 0.036 to 0.046, that is, a degree to which the power transfer efficiency Eff.2 of the second wireless power receiver 110-1 is decreased may be mitigated, as shown in (a) of FIG. 7D. Like this, if the transmission power of the wireless power transmitter 100 increases as the first wireless power receiver 110-1 is relatively closer to the wireless power transmitter 100, a problem that the power transfer efficiency of the second wireless power receiver 110-2 decreases may be addressed and overload of the wireless power transmitter 100 may be prevented and/or reduced by increasing the reception-side rectifier impedance of the first wireless power receiver 110-1.

According to an embodiment, the wireless power receiver 110 may map an output voltage $V_{RECT}$ measured at an output terminal of a rectification circuit 254 with an output voltage value and/or an output current value of the DC/DC converter 255 to be controlled and store mapped results in memory in a form of a table. According to an embodiment, the wireless power receiver 110 may map a changed amount (an initial value and a current value) of an output voltage $V_{RECT}$ measured at an output terminal of a rectification circuit 254 with an output voltage value and/or an output current value of the DC/DC converter 255 to be controlled and store mapped results in memory in a form of a table.

For example, if the output voltage $V_{RECT}$ measured at the output terminal of the rectification circuit 254 is changed as the distance between the first wireless power receiver 110-1 and the wireless power transmitter 100 is shorter or longer, the first wireless power receiver 110-1 may refer to the mapping table stored in the memory and adjust the reception-side rectifier impedance by controlling the output of the DC/DC converter 255 based on the output value (e.g., the output voltage or the output current) of the DC/DC converter 255 mapped to the output voltage $V_{RECT}$ measured at the output terminal of the rectification circuit 254 or the output value (e.g., the output voltage or the output current) of the DC/DC converter 255 mapped to the changed amount of the output voltage $V_{RECT}$.

According to various embodiments, the first wireless power receiver 110-1 may control the output of the DC/DC converter 255 according to the mapping table stored in the memory to adjust the reception-side rectifier impedance, and then track an optimum value by repeatedly performing an operation of increasing or decreasing the output of the DC/DC converter 255 by an additionally set value (e.g., 1V or 0.1 A).

Figure 8B:
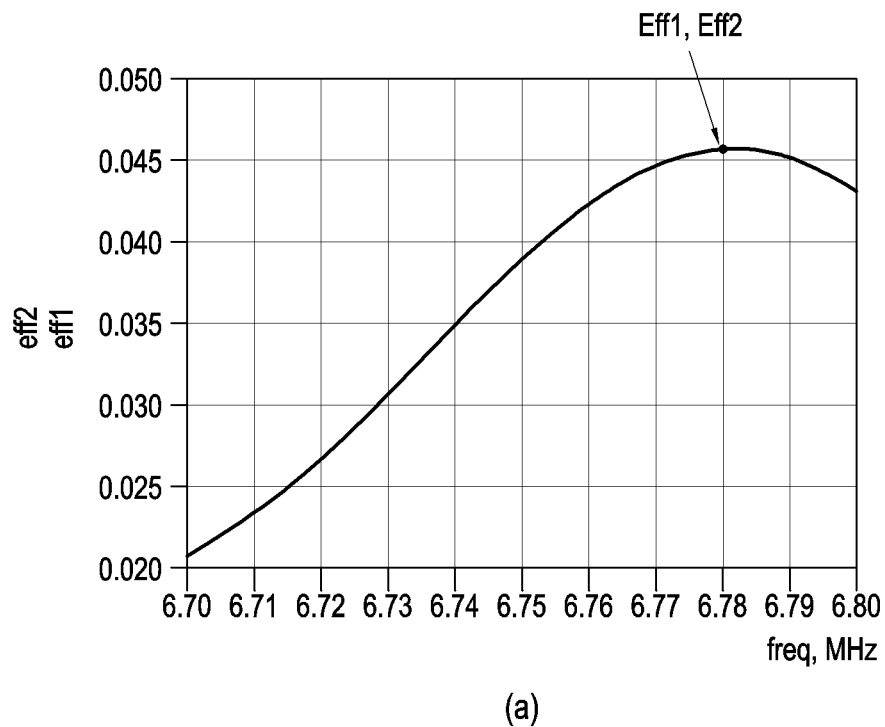
Figure 8B:
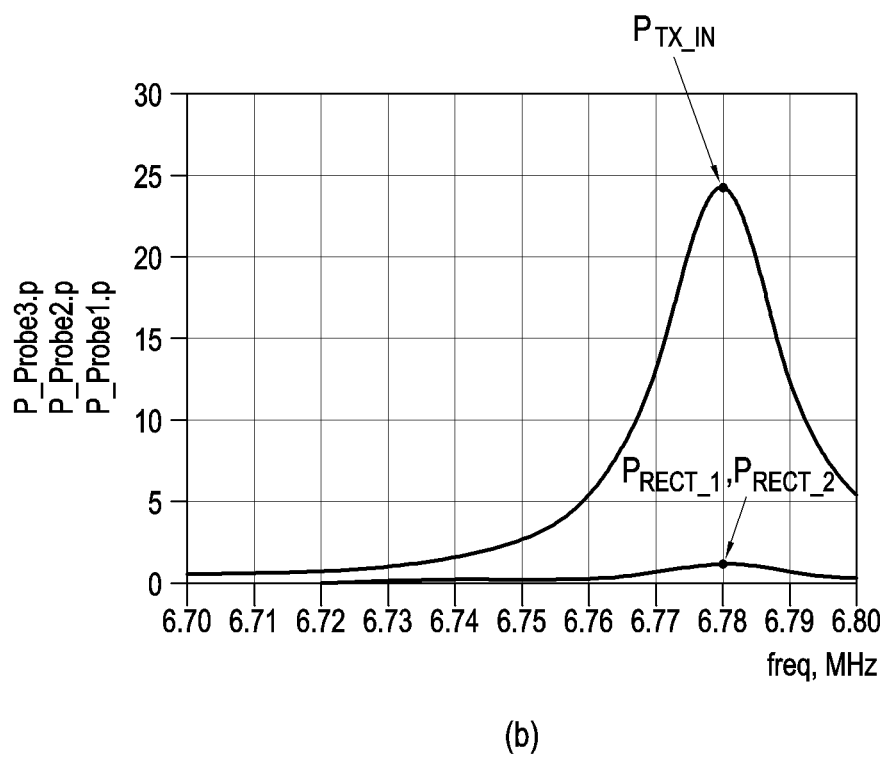
Figure 8C:
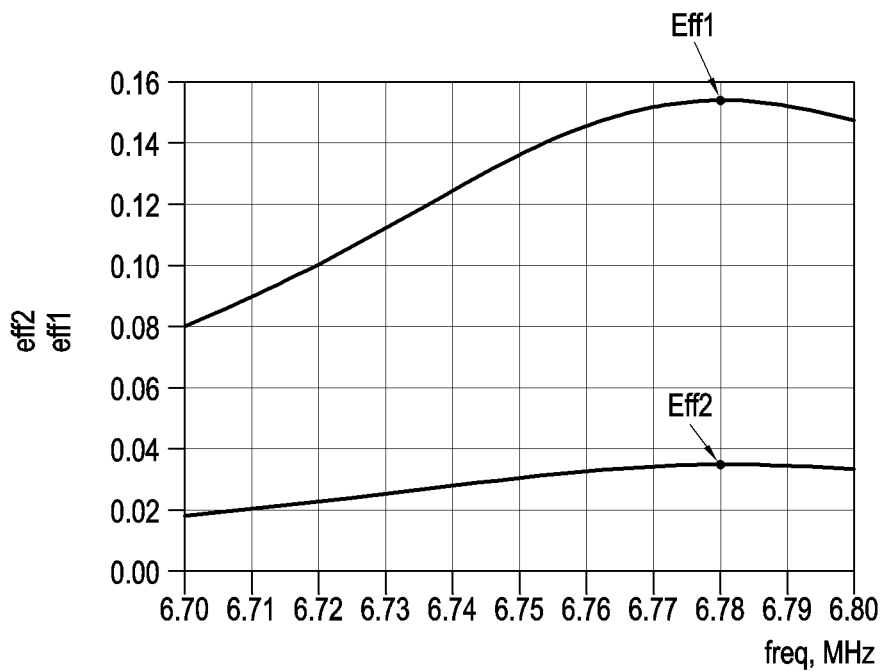
Figure 8C:
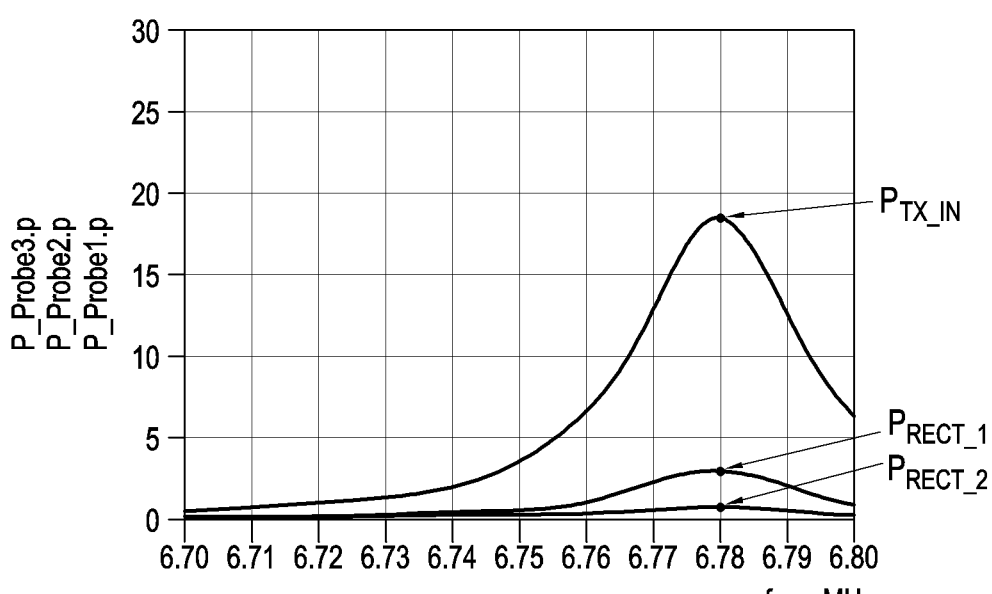
Figure 8D:
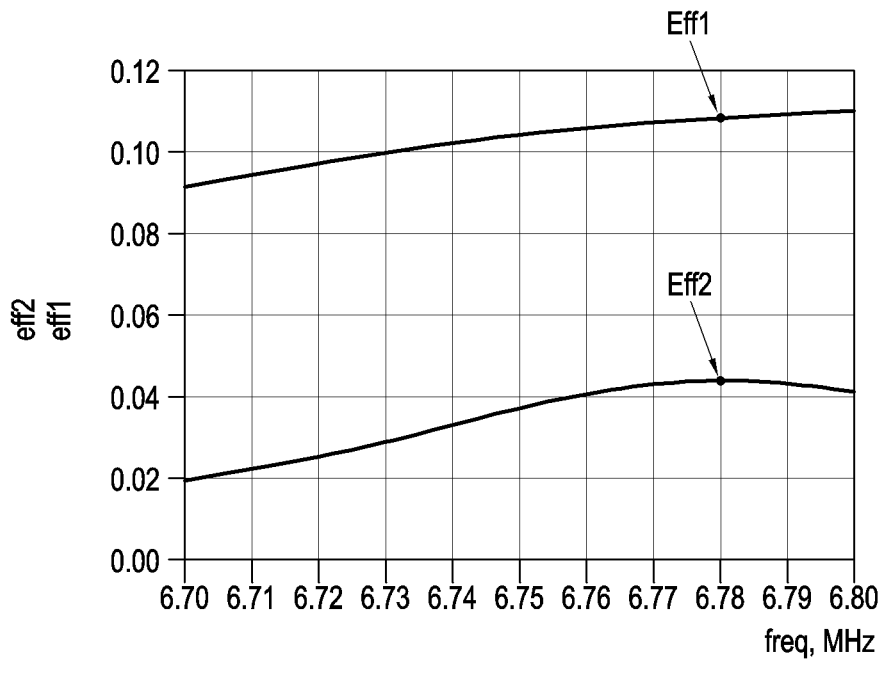
Figure 8D:
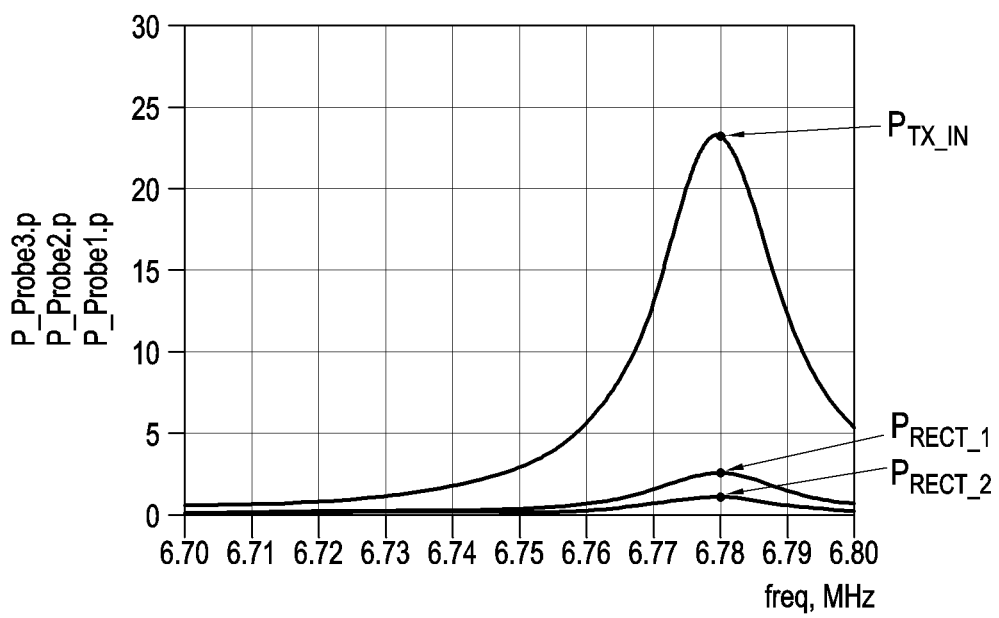

FIGS. 8A, 8B, 8C, and 8D are diagrams illustrating an example experimental result in a parallel-type resonance circuit according to various embodiments. Referring to FIG. 8A, it will be assumed that a wireless power transmitter 100 including a parallel-type resonance circuit 313b charges a plurality of wireless power receivers 110-1, 110-2, and 110-n (e.g., a first wireless power receiver 110-1 and a second wireless power 110-2). It may be assumed that a distance between the wireless power transmitter 100 and the first wireless power receiver 110-1 is the same as a distance between the wireless power transmitter 100 and the second wireless power receiver 110-2, but is not limited thereto. It may be assumed that a reception-side rectifier impedance $R_L^1$ of the first wireless power receiver 110-1 and a reception-side rectifier impedance $R_L^2$ of the second wireless power receiver 110-2 are the same each other and 5 ohms ($\Omega$), for a reception-side rectifier impedance $Z_{RECT}$ of each wireless power receiver 110, but is not limited thereto.

For example, if a distance between the first wireless power receiver 110-1 and the wireless power transmitter 100 and a distance between the second wireless power receiver 110-2 and the wireless power transmitter 100 are the same, and a reception-side rectifier impedance of the first wireless power receiver 110-1 and a reception-side rectifier impedance of the second wireless power receiver 110-2 are the same, it may be assumed that a coupling coefficient $k_1$ between the wireless power transmitter 100 and the first wireless power receiver 110-1 and a coupling coefficient $k_2$ between the wireless power transmitter 100 and the second wireless power receiver 110-2 are the same each other and 0.00236. In the assumed situation, as shown in (b) of FIG. 8B, a transmission power $P_{TX\_IN}$ of the wireless power transmitter 100 is 24.308 W, a reception power $P_{RECT\_1}$ measured at a rear end of a rectification circuit of the first wireless power receiver 110-1 is 1.109 W, and a reception power $P_{RECT\_2}$ measured at a rear end of a rectification circuit of the second wireless power receiver 110-2 is 1.109 W. As shown in (a) of FIG. 8B, from the measured values, power transfer efficiency Eff.1 of the first wireless power receiver 110-1 may be calculated as Eff.1=$P_{RECT\_1}/P_{TX\_IN}$ which is 0.046, and power transfer efficiency Eff.2 of the second wireless power receiver 110-2 may be calculated as Eff.2=$P_{RECT\_2}/P_{TX\_IN}$ which is 0.46 and the same value as Eff.1. According to various embodiments, if the first wireless power receiver 110-1 moves from a first location to a second location and is closer to the wireless power transmitter 100 than before the movement, the coupling coefficient $k_1$ between the first wireless power receiver 110-1 and the wireless power transmitter 100 may increase from 0.00236 to 0.005. If a resonance circuit 313 of the wireless power transmitter 100 is the parallel-type resonance circuit 313b, as described above, as the coupling coefficient $k_1$ increases, a transmission-side resonator impedance decreases, so the transmission power $P_{TX\_IN}$ of the wireless power transmitter 100 may decrease from 24.308 W to 18.478 W as shown in (b) of FIG. 8C. Accordingly, a reception power $P_{RECT\_1}$ (e.g., a reception power measured at a rear end of a rectification circuit) of the first wireless power receiver 110-1 may slightly increase from 1.109 W to 2.875 W as shown in (b) of FIG. 8C. And, a reception power $P_{RECT\_2}$ (e.g., a reception power measured at a rear end of a rectification circuit) of the second wireless power receiver 110-2 may significantly decrease from 1.109 W to 0.641 W as shown in (b) of FIG. 8C. According to a location movement of the first wireless power receiver 110-1, the power transfer efficiency Eff.1 of the first wireless power receiver 110-1 may increase from 0.046 to 0.156 as shown in (a) of FIG. 8C, while the power transfer efficiency Eff.2 of the second wireless power receiver 110-2 may decrease from 0.046 to 0.035 as shown in (a) of FIG. 8C.

As described above, if the coupling coefficient $k_1$ increases as coupling between the first wireless power receiver 110-1 and the wireless power transmitter 100 is stronger according to the location movement of the first wireless power receiver 110-1, a problem that the power transfer efficiency of the second wireless power receiver 110-2 decreases may occur.

In various embodiments of the present disclosure, as described above, if the coupling coefficient $k_1$ increases as the coupling between the first wireless power receiver 110-1 and the wireless power transmitter 100 is stronger according to the location movement of the first wireless power receiver 110-1, a problem that the power transfer efficiency of the second wireless power receiver 110-2 decreases may be addressed by adjusting an impedance (e.g., a load impedance or a reception-side rectifier impedance) of the first wireless power receiver 110-1 whose location is moved. According to various embodiments, a reception-side rectifier impedance may be increased by adjusting an output voltage or an output current of the DC/DC converter 255 of the first wireless power receiver 110-1 whose location is moved to adjust a load impedance. Various embodiments of a method of increasing the reception-side rectifier impedance by adjusting the load impedance will be described in greater detail below with reference to FIG. 9.

For example, as shown in FIG. 8A, if the distance between the first wireless power receiver 110-1 and the wireless power transmitter 100 is shorter according to the location movement of the first wireless power receiver 110-1, the first wireless power receiver 110-1 may increase the reception-side rectifier impedance $R_L^1$ by a set value. For example, as shown in Table 2 to be described later, if a coupling coefficient is doubled, the reception-side rectifier impedance $R_L^1$ may be increased from 5Ω to 25Ω. As the reception-side rectifier impedance $R_L^1$ of the first wireless power receiver 110-1 is increased from 5Ω to 25Ω, the transmission power of the wireless power transmitter 100 may be increased from 18.478 W to 23.250 W, that is, a degree to which the transmission power of the wireless power transmitter 100 is decreased may be mitigated, as shown in (b) of FIG. 8D. As the transmission power of the wireless power transmitter 100 is increased from 18.478 W to 23.250 W, the power transfer efficiency Eff.2 of the second wireless power receiver 110-1 may be increased from 0.035 to 0.044, that is, a degree to which the power transfer efficiency Eff.2 of the second wireless power receiver 110-1 is decreased may be mitigated, as shown in (a) of FIG. 7D. Like this, if the transmission power of the wireless power transmitter 100 decreases as the first wireless power receiver 110-1 is relatively closer to the wireless power transmitter 100, a problem that the power transfer efficiency of the second wireless power receiver 110-2 decreases may be addressed by increasing the reception-side rectifier impedance of the first wireless power receiver 110-1.

Figure 9:
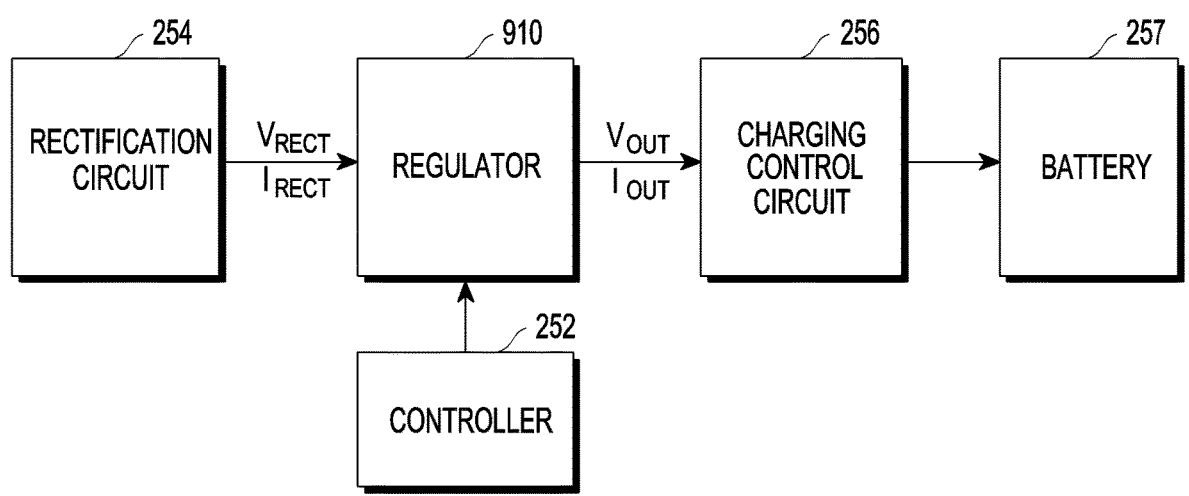
FIG. 9 is a block diagram illustrating an example structure of a wireless power receiver including a regulator according to various embodiments.

According to various embodiments, referring to Table 2 and Table 3 below, it will be understood that power transfer efficiency of the second wireless power receiver 110-2 may be maintained if the output of the DC/DC converter 255 is controlled such that a reception-side rectifier impedance is increased by 5 times whenever a ratio of a coupling coefficient k increases by 2 times as the wireless power receiver 110 moves. Table 2 shows a case that a reception-side rectifier impedance of both the first wireless power receiver 110-1 and the second wireless power receiver 110-2 is initialized to be 5Ω, and Table 3 shows a case that a reception-side rectifier impedance of both the first wireless power receiver 110-1 and the second wireless power receiver 110-2 is initialized to be 10Ω. In Table 2 and Table 3, $R_L$ denotes a resistance component for a reception-side rectifier impedance $Z_{RECT}$.

to various embodiments. Referring to FIG. 9, a DC/DC converter 255 in FIGS. 2A and 2B may be replaced with a regulator 910 or may include the regulator 910 according to an embodiment. According to various embodiments, the regulator 910 may be additionally disposed between the DC/DC converter 255 and a charging control circuit 256 or between the DC/DC converter 255 and a controller 252. According to various embodiments, the regulator 910 may be implemented as a linear regulator or a switching regulator (e.g., a switching mode power supply (SMPS)).

As described above, if the distance between the wireless power receiver 110 and the wireless power transmitter 100 changes as the location of the wireless power receiver 110 is moved, the coupling coefficient k changes and then a transmission-side resonator impedance changes, so overall charging efficiency may decrease. In various embodiments of the present disclosure, if the coupling coefficient k changes as the wireless power receiver 110 moves, the load impedance or the reception-side rectifier impedance may be adjusted by controlling an output (e.g., an output voltage $V_{OUT}$ or an output current $I_{OUT}$) of a regulator 910.

According to various embodiments, if the output voltage $V_{RECT}$ measured at the output terminal of the rectification circuit 254 increases as the distance between the wireless power receiver 110 and the wireless power transmitter 110 is short, the output of the regulator 910 may be controlled such that a magnitude of the reception-side rectifier impedance increases. For example, the controller 252 may transmit a control signal to the regulator 910 to control the output voltage $V_{OUT}$ or the output current $I_{OUT}$ of the regulator 910.

According to various embodiments, the controller 252 may control a magnitude of the output current (e.g., a limitation value of the output current) of the regulator 910 to be relatively smaller. As the output current of the regulator 910 is relatively smaller under the control of the controller 252, a magnitude of the load impedance $Z_{OUT}$ is relatively smaller, and a magnitude of an output current $I_{RECT}$ of the rectification circuit 254 input to the regulator 910 may be

TABLE 2

| $k_1$ | $k_2$ | $R_L^1$ | $R_L^2$ | k increase | R increase | Eff1 | Eff2 | $P_{TX\_IN}$ | $P_{RECT\_1}$ | $P_{RECT\_2}$ |
|---|---|---|---|---|---|---|---|---|---|---|
| 0.00236 | 0.00236 | 5 | 5 | 1 | 1 | 0.046 | 0.046 | 24.308 | 1.109 | 1.109 |
| 0.005 | 0.00236 | 25 | 5 | 2 | 5 | 0.108 | 0.044 | 23.25 | 2.507 | 1.016 |
| 0.01 | 0.00236 | 125 | 5 | 4 | 25 | 0.115 | 0.044 | 23.247 | 2.682 | 1.025 |
| 0.02 | 0.00236 | 625 | 5 | 8 | 125 | 0.1 | 0.045 | 21.389 | 2.133 | 0.957 |

TABLE 3

| $k_1$ | $k_2$ | $R_L^1$ | $R_L^2$ | k increase | R increase | Eff1 | Eff2 | $P_{TX\_IN}$ | $P_{RECT\_1}$ | $P_{RECT\_2}$ |
|---|---|---|---|---|---|---|---|---|---|---|
| 0.00236 | 0.00236 | 10 | 10 | 1 | 1 | 0.046 | 0.046 | 24.244 | 1.103 | 1.103 |
| 0.005 | 0.00236 | 50 | 10 | 2 | 5 | 0.109 | 0.043 | 23.124 | 2.525 | 1.005 |
| 0.01 | 0.00236 | 250 | 10 | 4 | 25 | 0.117 | 0.044 | 22.839 | 2.681 | 0.999 |
| 0.02 | 0.00236 | 1250 | 10 | 8 | 125 | 0.101 | 0.044 | 18.513 | 1.865 | 0.816 |

Hereinafter, a method of changing a load impedance or a reception-side rectifier impedance by controlling an output value of a regulator implementing a DC/DC converter 255 will be described in greater detail with reference to FIG. 9.

FIG. 9 is a block diagram illustrating an example structure of a wireless power receiver including a regulator according smaller than before due to a circuit operation of the regulator 910. As the magnitude of the output current $I_{RECT}$ output from the rectification circuit 254 is small, a magnitude of the reception-side rectifier impedance ($Z_{RECT}(R_L)=V_{RECT}/I_{RECT}$), which is an impedance of the output terminal of the rectification circuit 254, may increase. For example, as shown in FIG. 7A or 8A, the reception-side rectifier impedance may increase from 5Ω to 25Ω by controlling the output of the regulator 910.

According to various embodiments, if the controller 252 may control the magnitude of the output current (e.g., the limitation value of the output current) to be relatively smaller, a magnitude of the load impedance $Z_{OUT}$ is relatively smaller, so the magnitude of the voltage $V_{RECT}$ at the output terminal of the rectification circuit 254 may be larger than before due to a circuit operation of the regulator 910. Accordingly, as a magnitude of the voltage $V_{RECT}$ at the output terminal of the rectification circuit 254 is larger, the reception-side rectifier impedance $Z_{RECT}(R_L)$ may increase.

According to various embodiments, if the regulator 910 is a switching regulator, the reception-side rectifier impedance may be adjusted by adjusting the magnitude of the output voltage $V_{OUT}$ of the regulator 910. For example, if the regulator 910 is the switching regulator, if the controller 252 controls the magnitude of the output voltage $V_{OUT}$ of the regulator 910 to be relatively smaller, the magnitude of the load impedance $Z_{OUT}$ is relatively smaller, and the magnitude of the output current $I_{RECT}$ of the rectification circuit 254 input to the regulator 910 may be small by a circuit operation of the regulator 910. As the magnitude of the output current $I_{RECT}$ output from the rectification circuit 254 is small, the magnitude of the reception-side rectifier impedance $(Z_{RECT}(R_L)=V_{RECT}/I_{RECT})$, which is the impedance of the output terminal of the rectification circuit 254, may increase.

According to various embodiments, if the output voltage $V_{RECT}$ measured at the output terminal of the rectification circuit 254 decreases as the distance between the wireless power receiver 110 and the wireless power transmitter 100 is long, the output of the regulator 910 may be controlled such that the magnitude of the reception-side rectifier impedance decreases. For example, the controller 252 may transmit a control signal to the regulator 910 to control the output voltage $V_{OUT}$ or the output current $I_{OUT}$ of the regulator 910.

According to various embodiments, the controller 252 may control a magnitude of the output current (e.g., a limitation value of the output current) of the regulator 910 to be relatively larger. As the output current of the regulator 910 is relatively larger under the control of the controller 252, a magnitude of the load impedance $Z_{OUT}$ is relatively larger, and a magnitude of an output current $I_{RECT}$ output from the rectification circuit 254 input to the regulator 910 may be larger than before due to a circuit operation of the regulator 910. As the magnitude of the output current $I_{RECT}$ output from the rectification circuit 254 is relatively larger, a magnitude of the reception-side rectifier impedance $(Z_{RECT}(R_L)=V_{RECT}/I_{RECT})$, which is an impedance of the output terminal of the rectification circuit 254, may be small.

According to various embodiments, if the controller 252 controls the magnitude of the output current (e.g., the limitation value of the output current) to be relatively larger, a magnitude of the load impedance $Z_{OUT}$ is relatively larger, so the magnitude of the voltage $V_{RECT}$ at the output terminal of the rectification circuit 254 may be smaller than before due to a circuit operation of the regulator 910. Like this, as a magnitude of the voltage $V_{RECT}$ at the output terminal of the rectification circuit 254 is small, the magnitude of the reception-side rectifier impedance $Z_{RECT}(R_L)$ may be small.

According to various embodiments, if the regulator 910 is a switching regulator, the reception-side rectifier impedance may be adjusted by adjusting the magnitude of the output voltage $V_{OUT}$ of the regulator 910. For example, if the regulator 910 is the switching regulator, if the controller 252 controls the magnitude of the output voltage $V_{OUT}$ of the regulator 910 to be relatively larger, the magnitude of the load impedance $Z_{OUT}$ is relatively larger, and the magnitude of the output current $I_{RECT}$ of the rectification circuit 254 input to the regulator 910 may be larger by a circuit operation of the regulator 910. As the magnitude of the output current $I_{RECT}$ output from the rectification circuit 254 is larger, the magnitude of the reception-side rectifier impedance $(Z_{RECT}(R_L)=V_{RECT}/I_{RECT})$, which is the impedance of the output terminal of the rectification circuit 254, may decrease.

Hereinafter, an example operating method of an electronic device according to various embodiments will be described in greater detail below with reference to FIGS. 10, 11, 12, and 13.

Figure 10:
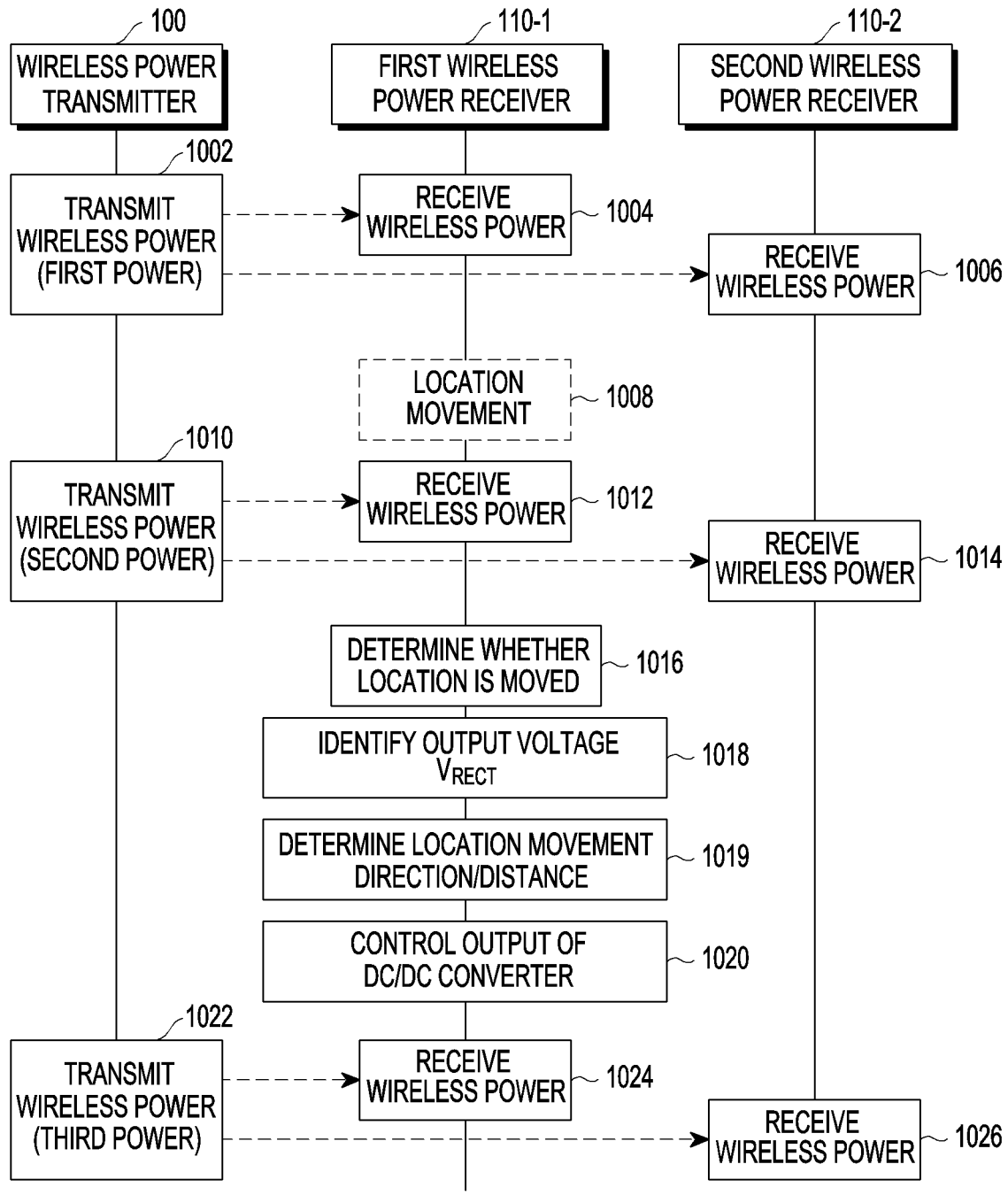
FIG. 10 is a flow diagram illustrating an example wireless power transmitting procedure according to various embodiments.

FIG. 10 is a flow diagram illustrating an example wireless power transmitting procedure according to various embodiments. Operations of each device in FIG. 10 may be performed by each component described in FIGS. 2A, 2B, and 3, and a detailed description thereof may not be provided here. Referring to FIG. 10, in operation 1002, a wireless power transmitter 100 may transmit a wireless power of a first power to a plurality of wireless power receivers 110-1, 110-2, and 110-n (not shown here) (e.g., a first wireless power receiver 110-1 and a second wireless power receiver 110-2). In operation 1004, the first wireless power receiver 110-1 may receive the wireless power transmitted from the wireless power transmitter 100. In operation 1006, the second wireless power receiver 110-2 may receive the wireless power transmitted from the wireless power transmitter 100.

In operation 1008, a location of the first wireless power receiver 110-1 is moved from a first location to a second location, as described above, and a coupling coefficient $k_1$ between the wireless power transmitter 100 and the first wireless power receiver 110-1 is changed, so a magnitude of a transmission power $P_{TX\_IN}$ of the wireless power transmitter 100 may be changed from a first power to a second power. Accordingly, in operation 1010, the wireless power transmitter 100 may transmit a wireless power of the second power to the first wireless power receiver 110-1 and the second wireless power receiver 110-2. In operation 1012, the first wireless power receiver 110-1 may receive a changed wireless power transmitted from the wireless power transmitter 100. In operation 1014, the second wireless power receiver 110-2 may receive the changed wireless power transmitted from the wireless power transmitter 100.

According to an embodiment, in operation 1016, the first wireless power receiver 110-1 may determine whether a location is moved using a sensor (e.g., a motion sensor 259). If it is determined that the location is moved, a controller 252 of the first wireless power receiver 110-1 may identify an output voltage $V_{RECT}$ of an output terminal of a rectification circuit 254 in operation 1018. According to various embodiments, in operation 1019, the controller 252 of the first wireless power receiver 110-1 may determine a location movement direction (e.g., whether the location is closer to the wireless power transmitter 100 or farther away from the wireless power transmitter 100) or a distance between the first wireless power receiver 110-1 and the wireless power transmitter 100 based on the identified output voltage $V_{RECT}$.

According to various embodiments, the first wireless power receiver 110-1 may control an output (e.g., an output voltage or an output current) of a DC/DC converter 255

(e.g., a regulator 910) based on whether the location is moved and the output voltage in operation 1020.

By controlling the output of the DC/DC converter 255 in the first wireless power receiver 110-1, a reception-side rectifier impedance of the first wireless power receiver 110-1 may be changed as described above, accordingly, in operation 1022, the transmission power $P_{TX\_IN}$ of the wireless power transmitter 100 may be changed from the second power to a third power. In operation 1024, the first wireless power receiver 110-1 may receive a changed wireless power from the wireless power transmitter 100. In operation 1026, the second wireless power receiver 110-2 may receive the changed wireless power from the wireless power transmitter 100.

Figure 11:
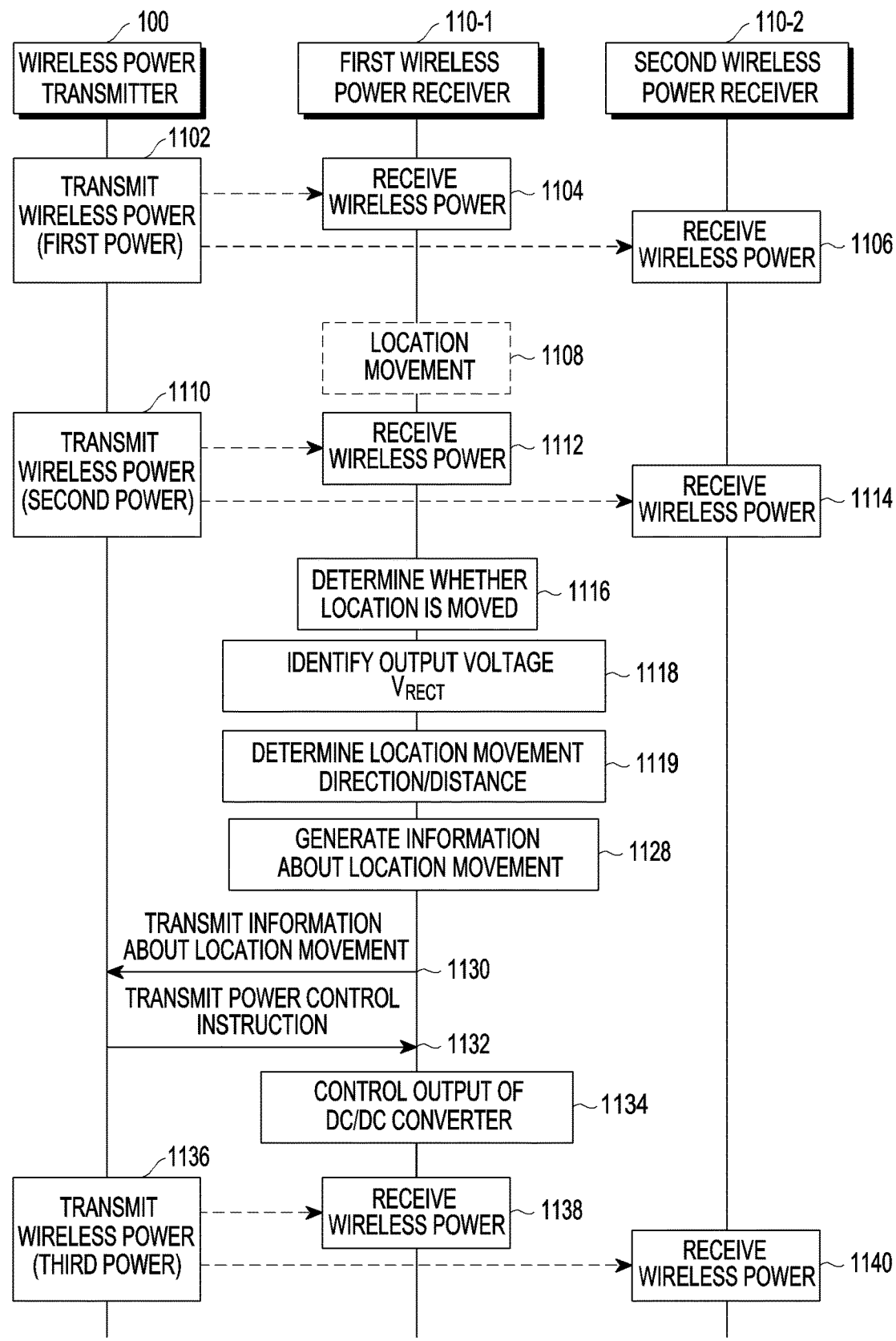
FIG. 11 is a flow diagram illustrating an example wireless power transmitting procedure according to various embodiments.

FIG. 11 is a flow diagram illustrating an example wireless power transmitting procedure according to various embodiments. Operations of each device in FIG. 11 to be described later may be performed by each component described in FIGS. 2A, 2B, and 3, and a detailed description thereof may not be provided here. Referring to FIG. 11, in operation 1102, a wireless power transmitter 100 may transmit a wireless power of a first power to a plurality of wireless power receivers 110-1, 110-2, and 110-n (not shown) (e.g., a first wireless power receiver 110-1 and a second wireless power receiver 110-2). In operation 1104, the first wireless power receiver 110-1 may receive the wireless power transmitted from the wireless power transmitter 100. In operation 1106, the second wireless power receiver 110-2 may receive the wireless power transmitted from the wireless power transmitter 100.

In operation 1108, a location of the first wireless power receiver 110-1 is moved from a first location to a second location, as described above, and a coupling coefficient $k_1$ between the wireless power transmitter 100 and the first wireless power receiver 110-1 is changed, so a magnitude of a transmission power $P_{TX\_IN}$ of the wireless power transmitter 100 may be changed from a first power to a second power. Accordingly, in operation 1110, the wireless power transmitter 100 may transmit a wireless power of the second power to the first wireless power receiver 110-1 and the second wireless power receiver 110-2. In operation 1012, the first wireless power receiver 110-1 may receive a changed wireless power transmitted from the wireless power transmitter 100. In operation 1114, the second wireless power receiver 110-2 may receive the changed wireless power transmitted from the wireless power transmitter 100.

According to an embodiment of the present disclosure, in operation 1116, the first wireless power receiver 110-1 may determine whether a location is moved using a sensor (e.g., a motion sensor 259). If it is determined that the location is moved, a controller 252 of the first wireless power receiver 110-1 may identify an output voltage $V_{RECT}$ of an output terminal of a rectification circuit 254 in operation 1118. According to various embodiments, in operation 1119, the controller 252 of the first wireless power receiver 110-1 may determine a location movement direction (e.g., whether the location is closer to the wireless power transmitter 100 or farther away from the wireless power transmitter 100) or a distance between the first wireless power receiver 110-1 and the wireless power transmitter 100 based on the identified output voltage $V_{RECT}$.

According to various embodiments, the controller 252 of the first wireless power receiver 110-1 may generate information related to a location movement based on at least one of whether the location is moved, the location movement direction, or the distance in operation 1128. The controller 252 of the first wireless power receiver 110-1 may transmit, via a communication unit 253, the generated information related to the location movement to the wireless power transmitter 100 in operation 1130. The wireless power transmitter 100 may receive the information related to the location movement of the first wireless power receiver 110-1, and accordingly, transmit, to the first wireless power receiver 110-1, a power control instruction for controlling a reception power of the first wireless power receiver 110-1 in operation 1132. According to an embodiment, the power control instruction may include an instruction to change a reception-side rectifier impedance of the first wireless power receiver 110-1 or an instruction to change a load impedance of the first wireless power receiver 110-1. According to an embodiment, the power control instruction may include an instruction to adjust an output (e.g., an output current or an output voltage) of a DC/DC converter 255 or a regulator 910 of the first wireless power receiver 110-1.

According to an embodiment, if the wireless power transmitter 100 determines that a location of the wireless power transmitter 100 is closer to the first wireless power receiver 110-1 or farther away from the first wireless power receiver 110-1 based on the information related to the location movement received from the first wireless power receiver 110-1 in operation 1130, the wireless power transmitter 100 may increase or decrease a transmission power by a preset value and transmit an increased or decreased transmission power.

According to an embodiment, the controller 252 of the first wireless power receiver 110-1 may receive the power control instruction from the wireless power transmitter 100, and control the output (e.g., the output current or the output voltage) of the DC/DC converter 255 (or the regulator 910) based on the received power control instruction in operation 1134.

By controlling the output of the DC/DC converter 255 in the first wireless power receiver 110-1, a reception-side rectifier impedance of the first wireless power receiver 110-1 may be changed as described above, accordingly, in operation 1136, the transmission power $P_{TX\_IN}$ of the wireless power transmitter 100 may be changed from the second power to a third power. In operation 1138, the first wireless power receiver 110-1 may receive a changed wireless power transmitted from the wireless power transmitter 100. In operation 1140, the second wireless power receiver 110-2 may receive the changed wireless power transmitted from the wireless power transmitter 100.

Figure 12:
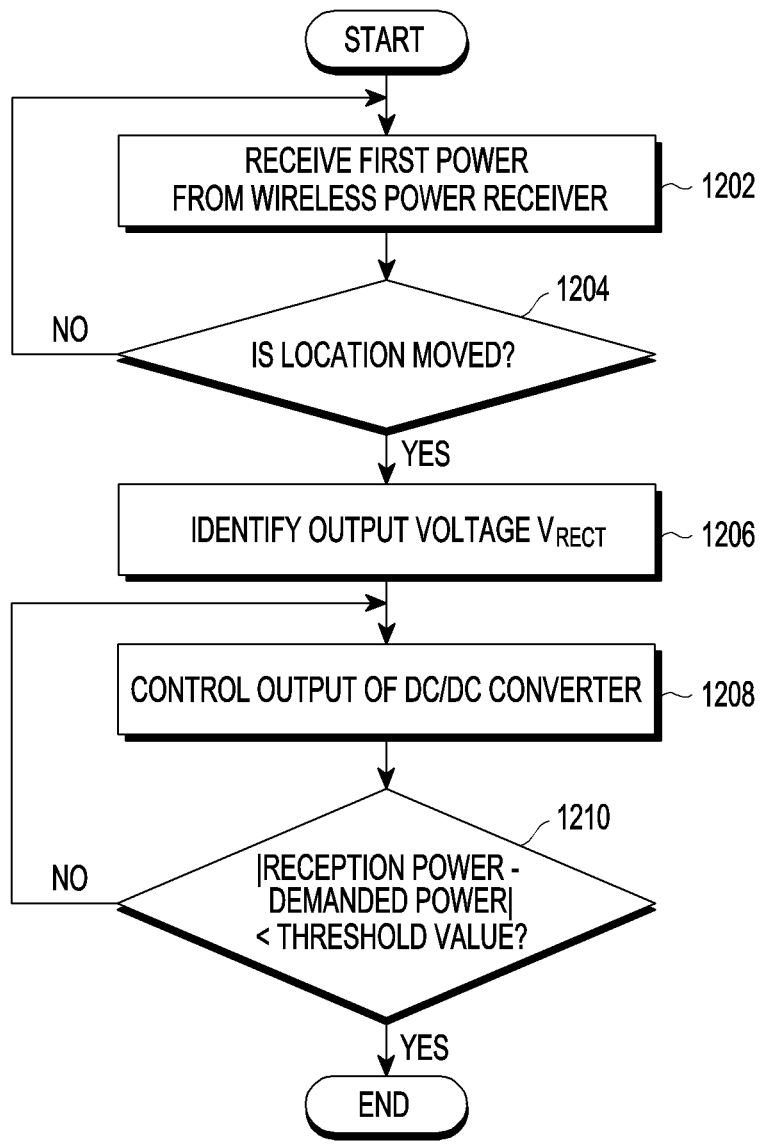
FIG. 12 is a flowchart illustrating an example procedure in a wireless power receiver according to various embodiments.

FIG. 12 is a flowchart illustrating an example procedure in a wireless power receiver according to various embodiments.

Referring to FIG. 12, in operation 1202, a wireless power receiver 110 may receive a first power from a wireless power transmitter 100. In operation 1204, the wireless power receiver 110 may determine whether a location is moved using a sensor (e.g., a motion sensor 259). If it is determined that the location of the wireless power receiver 110 is moved ("Yes" in operation 1204), the wireless power receiver 110 may identify an output voltage $V_{RECT}$ at a rear end of a rectification circuit 254 in operation 1206. If it is identified that the output voltage $V_{RECT}$ at the rear end of the rectification circuit 254 is changed by a set threshold value or by more than the set threshold value, the wireless power receiver 110 may adjust a load impedance or a reception-side rectifier impedance by controlling an output (e.g., an output voltage or an output current) of a DC/DC converter 255 (e.g., a regulator 910) in operation 1208

In operation 1210, as a result of controlling the output (e.g., the output voltage or the output current) of the DC/DC converter 255, if a difference between a reception power (e.g., an output power $P_{RECT}$ measured at the rear end of the rectification circuit 254) and a demanded power set by the wireless power receiver 110 is greater than (or greater than or equal to) a set threshold value (1210-No), the wireless power receiver 110 may repeatedly perform an output control procedure for the DC/DC converter 255 in operation 1208. As the result of controlling the output (e.g., the output voltage or the output current) of the DC/DC converter 255, if the difference between the reception power (e.g., the output power $P_{RECT}$ measured at the rear end of the rectification circuit 254) and the demanded power $P_{dem}$ (e.g., a reference power $P_{ref}$) set by the wireless power receiver 110 is less than the set threshold value (1210—Yes), the wireless power receiver 110 may terminate the output control procedure for the DC/DC converter 255 in operation 1208. For example, the output control procedure for the DC/DC converter 255 may be performed as shown in Table 4 below.

TABLE 4

| $V_{OUT}$ | $P_{RECT}$ | $P_{ref}$ | $|P_{RECT}-P_{ref}|$ | ε |
|---|---|---|---|---|
| 5 V | 13 W | 10 W | 3 | 0.5 |
| 6 V | 12 W | 10 W | 2 | 0.5 |
| 7 V | 11 W | 10 W | 1 | 0.5 |
| 8 V | 10.3 W | 10 W | 0.3 | 0.5 |

Referring to Table 4, for example, in a state that the output voltage $V_{OUT}$ of the DC/DC converter 255 (e.g., the regulator 910) is controlled to be 5V, it may be identified that $P_{RECT}$ is 13 W. If it is assumed that the required power $P_{dem}$ (e.g., the reference power Pam) set in the wireless power receiver 110 is 10 W and the threshold value c is 0.5 W, a difference between the reception power of the wireless power receiver 110 (e.g., the output power $P_{RECT}$ measured at the rear end of the rectification circuit 254) and the reference power is 3 W, which is greater than the threshold value of 0.5 W, so the wireless power receiver 110 may further adjust an output of the DC/DC converter 255 for decreasing the difference between the reception power and the reference power. For example, the controller 252 of the wireless power receiver 110 may increase the output voltage of the DC/DC converter 255 (e.g., the regulator 910) by a unit voltage (e.g., 1V). Like this, if the output voltage of the DC/DC converter 255 is increased, as the output current is relatively small, a magnitude of the load impedance $Z_{OUT}$ is relatively small, and a magnitude of the reception-side rectifier impedance $(Z_{RECT}(R_L)=V_{RECT}/I_{RECT})$ which is an impedance of an output terminal of the rectification circuit 254 may be increased as a magnitude of the output current $I_{RECT}$ output from the rectification circuit 254 which is input to the regulator 910 is decreased. As the magnitude of the reception-side rectifier impedance is increased, the reception power $P_{RECT}$ of the wireless power receiver 110 may be relatively decreased. For example, as described above, as the wireless power receiver 110 increases the output voltage of the DC/DC converter 255 from 5V to 6V by 1V via the controller 252, the reception power $P_{RECT}$ of the wireless power receiver 110 may be decreased from 13 W to 12 W. As the reception power decreases, the difference between the reception power of the wireless power receiver 110 and the reference power is 2 W, which is still greater than the threshold value of 0.5 W, so the wireless power receiver 110 may further adjust the output of the DC/DC converter 255 for decreasing the difference between the reception power of the wireless power receiver 110 and the reference power.

As shown in Table 4, the wireless power receiver 110 may control the controller 252 to increase the output voltage of the DC/DC converter 255 from 6V to 7V by 1V, so the reception power $P_{RECT}$ of the wireless power receiver 110 may be decreased from 12 W to 11 W according to the control. As the reception power decreases, the difference between the reception power of the wireless power receiver 110 and the reference power is 1 W, which is still greater than the threshold value of 0.5 W, so the wireless power receiver 110 may further adjust the output of the DC/DC converter 255 for decreasing the difference between the reception power of the wireless power receiver 110 and the reference power.

The wireless power receiver 110 may control the controller 252 to increase the output voltage of the DC/DC converter 255 from 7V to 8V by 1V, so the reception power $P_{RECT}$ of the wireless power receiver 110 may be decreased from 11 W to 10.3 W according to the control. As the reception power decreases, the difference between the reception power of the wireless power receiver 110 and the reference power is 0.3 W, which is less than the threshold value of 0.5 W, so the wireless power receiver 110 may terminate the procedure without additional control.

The numerical values illustrated in Table 4 are example values for explanation, and the example values may be variously changed or set according to a characteristic or a situation of each device.

Figure 13:
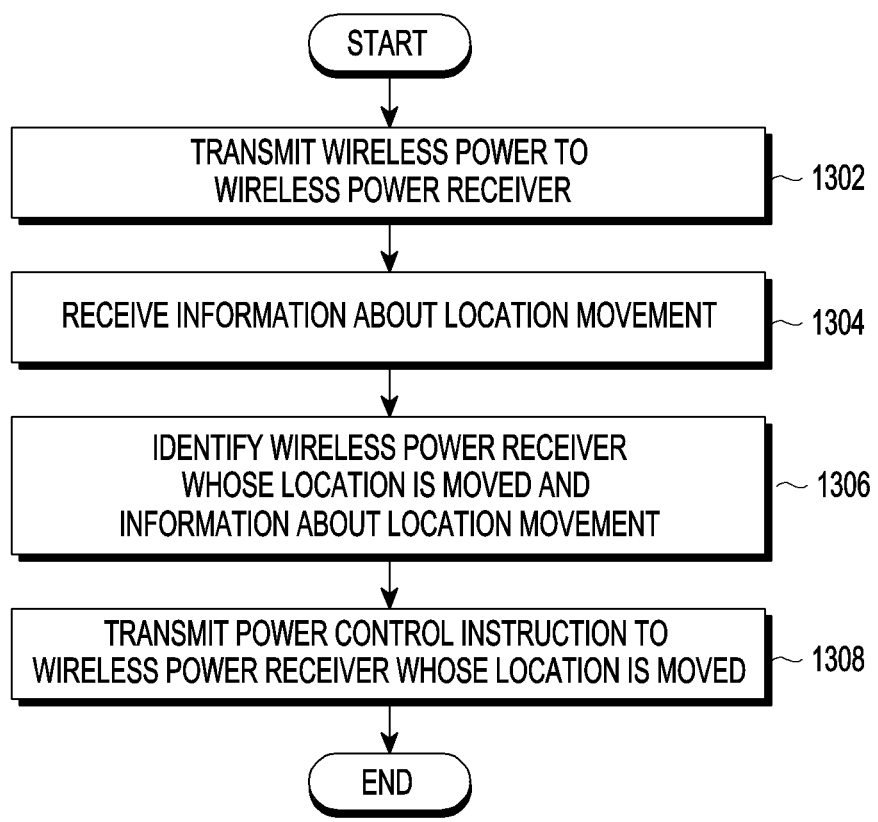
FIG. 13 is a flowchart illustrating an example procedure in a wireless power transmitter according to various embodiments.

FIG. 13 is a flowchart illustrating an example procedure in a wireless power transmitter according to various embodiments. Referring to FIG. 13, in operation 1302, a wireless power transmitter 100 may transmit a transmission power $P_{TX\_IN}$ to a wireless power receiver 110.

According to various embodiments, in operation 1304, the wireless power transmitter 100 may receive information related to a location movement from the wireless power receiver 110. For example, the information related to the location movement may include at least one of information indicating that a location of the wireless power receiver 110 is closer to the wireless power transmitter 100 or farther away from the wireless power transmitter 100, or information related to a movement distance or information related to whether the location is moved. If the wireless power transmitter 100 and the wireless power receiver 110 transmit and receive a wireless power in a manner defined in Alliance for Wireless Power (A4WP) standard (or air fuel alliance (AFA) standard), the information related to the location movement may be included in one message (e.g., a PRU dynamic message) defined in the standard and transmitted.

According to various embodiments, in operation 1306, the wireless power transmitter 100 may identify the wireless power receiver 110 (e.g., a first wireless power receiver 110-1) whose location is moved and the information related to the location movement transmitted from the wireless power receiver 110.

According to various embodiments, in operation 1308, the wireless power transmitter 100 may receive the information related to the location movement of the wireless power receiver 110, and accordingly, transmit, to the wireless power receiver 110, a power control instruction for controlling a reception power of the wireless power receiver 110. According to an embodiment, the power control instruction may include an instruction to change a reception-side rectifier impedance of the wireless power receiver 110 or an instruction to change a load impedance of the wireless power receiver 110. According to an embodiment, the power control instruction may include an instruction to adjust an output (e.g., an output current or an output voltage) of a DC/DC converter 255 or a regulator 910 of the wireless power receiver 110. According to various embodiments, if the wireless power transmitter 100 and the wireless power receiver 110 transmit and receive a wireless power in a manner defined in A4WP standard (or AFA standard), the power control instruction may be included in a PRU control message and transmitted. The wireless power receiver 110 (e.g., the first wireless power receiver 110-1) whose location is moved may receive the power control instruction from the wireless power transmitter 100, and control the output (e.g., the output current or the output voltage) of the DC/DC converter 255 (or the regulator 910) based on the received power control instruction. The wireless power receiver 110 may change the load impedance or the reception-side rectifier impedance by controlling the output of the DC/DC converter 255. According to various embodiments, the instruction to change the impedance of the first wireless power receiver 110-1 according to operation 1308 may be repeatedly performed until a reception power measured at a second wireless power receiver 110-2 which is received from the second wireless power receiver 110-2 is greater than a set threshold value. As described above, the wireless power receiver 110 (e.g., the first wireless power receiver 110-1) whose location is moved may change the load impedance or the reception-side rectifier impedance by changing the output (e.g., the output voltage or the output current) of the DC/DC converter 255.

A method for controlling wireless charging in an electronic device (e.g., a wireless power receiver) according to an example may comprise: receiving a first power from a wireless power transmitter, identifying movement information of the electronic device corresponding to a value sensed via a sensor, identifying a voltage value of a direct current (DC) power rectified via a rectification circuit which rectifies the received first power into the DC power, and controlling an output of a DC/DC converter which is configured to convert the rectified DC power to output a converted power based on the movement information and the voltage value.

According to various example embodiments, controlling the output of the DC/DC converter may include controlling at least one of an output voltage or an output current of the DC/DC converter.

According to various example embodiments, the method may further comprise controlling the output of the DC/DC converter such that an impedance of a rear end of the rectification circuit increases based on the voltage value of the DC power increasing.

According to various example embodiments, the method may further comprise controlling the output of the DC/DC converter such that an impedance of a rear end of the rectification circuit decreases based on the voltage value of the DC power decreasing.

According to various example embodiments, the method may further comprise generating information related to location movement based on an identified result of the voltage value of the DC power rectified via the rectification circuit, and transmitting the generated information related to the location movement via a communication circuit.

According to various example embodiments, the information related to the location movement may include at least one of information indicating that a location of the electronic device is closer than a specified distance to a wireless power transmitter or farther away than a specified distance from the wireless power transmitter, or information related to a movement distance.

According to various example embodiments, the information related to the location movement may be included in a PRU dynamic message and transmitted.

Figure 14:
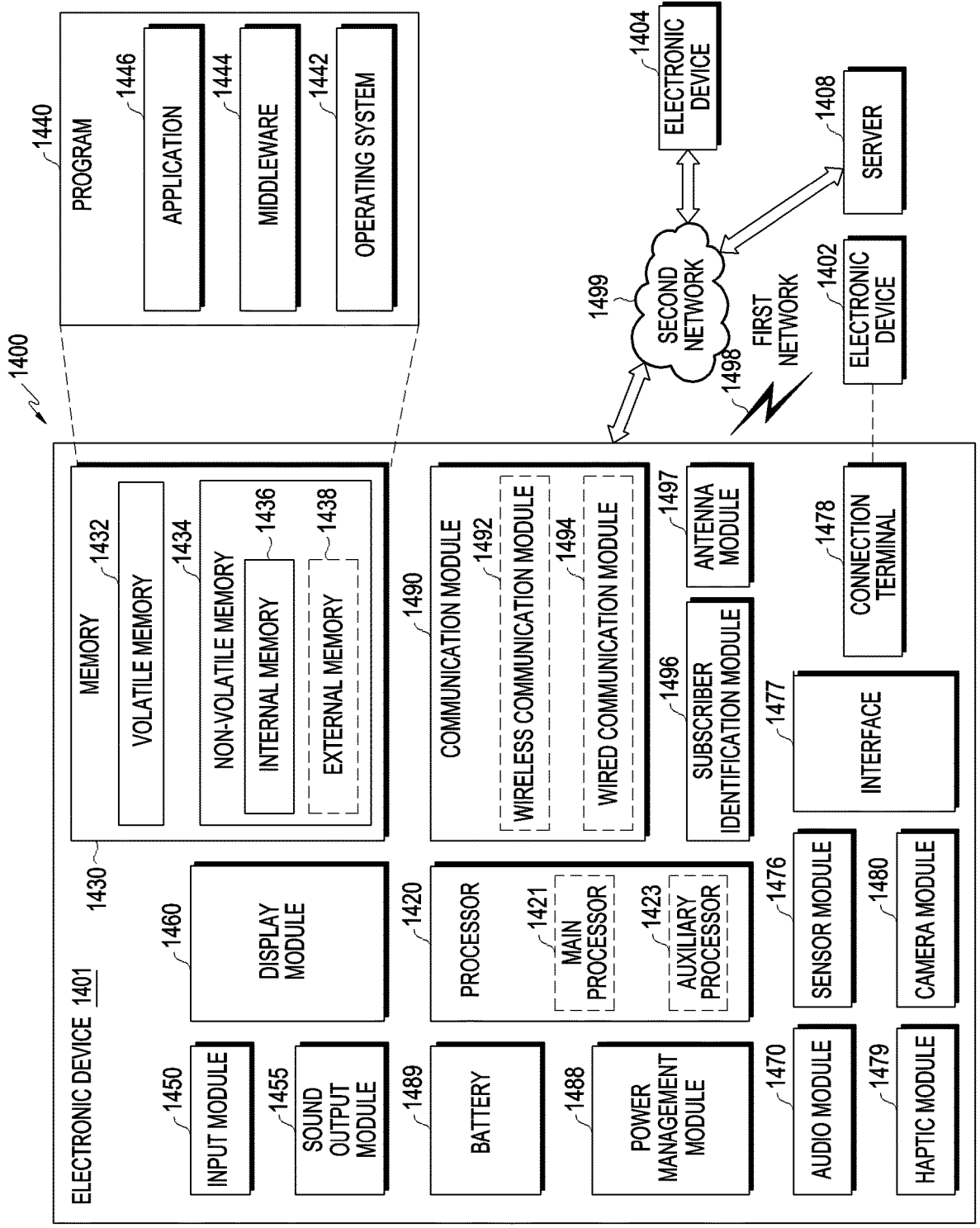
FIG. 14 is a block diagram illustrating an example electronic device in a network environment according to various embodiments.

FIG. 14 is a block diagram illustrating an example electronic device 1401 in a network environment 1400 according to various embodiments. Referring to FIG. 14, the electronic device 1401 (e.g., a wireless power transmitter 100 or a wireless power receiver 110) in the network environment 1400 may communicate with an electronic device 1402 (e.g., the wireless power transmitter 100 or the wireless power receiver 110) via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420 (e.g., a processor 258 in FIGS. 2A and 2B), memory 1430, an input module 1450, a sound output module 1455, a display module 1460, an audio module 1470, a sensor module 1476 (e.g., a motion sensor 259 in FIGS. 2A and 2B), an interface 1477, a connecting terminal 1478, a haptic module 1479, a camera module 1480, a power management module 1488 (e.g., a charging control circuit 256 in FIGS. 2A and 2B), a battery 1489 (e.g., a battery 257 in FIGS. 2A and 2B), a communication module 1490 (e.g., a communication unit 253 in FIGS. 2A and 2B), a subscriber identification module (SIM) 1496, or an antenna module 1497. In some embodiments, at least one of the components (e.g., the connecting terminal 1478) may be omitted from the electronic device 1401, or one or more other components may be added in the electronic device 1401. In some embodiments, some of the components (e.g., the sensor module 1476, the camera module 1480, or the antenna module 1497) may be implemented as a single component (e.g., the display module 1460).

The processor 1420 may execute, for example, software (e.g., a program 1440) to control at least one other component (e.g., a hardware or software component) of the electronic device 1401 coupled with the processor 1420, and may perform various data processing or computation. According to an example embodiment, as at least part of the data processing or computation, the processor 1420 may store a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), or an auxiliary processor 1423 (e.g., a graphics processing unit (GPU), a neural processing unit (NPU), an image signal processor (ISP), a sensor hub processor, or a communication processor (CP)) that is operable independently from, or in conjunction with, the main processor 1421. For example, when the electronic device 1401 includes the main processor 1421 and the auxiliary processor 1423, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display module 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423. According to an embodiment, the auxiliary processor 1423 (e.g., the neural processing unit) may include a hardware structure specified for artificial intelligence model processing. An artificial intelligence model may be generated by machine learning. Such learning may be performed, e.g., by the electronic device 1401 where the artificial intelligence is performed or via a separate server (e.g., the server 1408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output sound signals to the outside of the electronic device 1401. The sound output module 1455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to detect a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450, or output the sound via the sound output module 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to an embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN)

communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The wireless communication module 1492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., the mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1492 may support various requirements specified in the electronic device 1401, an external electronic device (e.g., the electronic device 1404), or a network system (e.g., the second network 1499).

According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device) of the electronic device 1401. According to an embodiment, the antenna module 1497 may include an antenna including a radiating element including a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

According to various embodiments, the antenna module 1497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 or 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra low-latency services using, e.g., distributed computing or mobile edge computing. In an embodiment, the external electronic device 1404 may include an internet-of-things (IoT) device. The server 1408 may be an intelligent server using machine learning and/or a neural network. According to an embodiment, the external electronic device 1404 or the server 1408 may be included in the second network 1499. The electronic device 1401 may be applied to intelligent services (e.g., smart home, smart city, smart car, or healthcare) based on 5G communication technology or IoT-related technology.

An electronic device and a method for controlling wireless charging in the electronic device according to various embodiments of the present disclosure may increase power transfer efficiency of an entire system and stabilize a reception power of a wireless power receiver by changing an impedance (e.g., a load impedance at an output terminal of a DC/DC converter or a reception-side rectifier impedance at a rear end of a rectification circuit) of the wireless power receiver when the wireless power receiver moves while a wireless power transmitter charges the wireless power receiver.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device, comprising:
   a sensor;
   a battery;
   a resonance circuit configured to wirelessly receive power;
   a rectification circuit configured to rectify an alternating current (AC) power provided from the resonance circuit into a direct current (DC) power;
   a DC/DC converter configured to convert the DC power provided from the rectification circuit to output a converted power;
   a charging control circuit configured to charge the battery using the converted power provided from the DC/DC converter; and
   a controller,
   wherein the controller is configured to:
      identify whether the electronic device has moved based on a value sensed via the sensor,
      based on identifying that the electronic device has moved, identify a voltage value of the DC power rectified via the rectification circuit, and
      based on identifying that the voltage value of the DC power rectified via the rectification circuit increases, control the DC/DC converter to increase an impedance of a rear end of the rectification circuit by adjusting an output of the DC/DC converter, to decrease power transfer efficiency of the electronic device.

2. The electronic device of claim 1, wherein controlling the output of the DC/DC converter includes controlling at least one of an output voltage or an output current of the DC/DC converter.

3. The electronic device of claim 1, wherein the DC/DC converter includes a linear regulator, and
wherein the controller is configured to control the linear regulator to decrease an output current of the DC/DC converter based on the voltage value of the DC power increasing.

4. The electronic device of claim 1, wherein the DC/DC converter includes a switching regulator, and
wherein the controller is configured to control the switching regulator to decrease at least one of an output voltage or an output current of the DC/DC converter based on the voltage value of the DC power increasing.

5. The electronic device of claim 1, wherein the controller is configured to control the output of the DC/DC converter to decrease an impedance of a rear end of the rectification circuit based on the voltage value of the DC power decreasing.

6. The electronic device of claim 5, wherein the DC/DC converter includes a linear regulator, and
wherein the controller is configured to control the linear regulator to decrease an output voltage of the DC/DC converter based on the voltage value of the DC power decreasing.

7. The electronic device of claim 5, wherein the DC/DC converter includes a switching regulator, and
wherein the controller is configured to control the switching regulator to increase at least one of an output voltage or an output current of the DC/DC converter based on the voltage value of the DC power decreasing.

8. The electronic device of claim 1, further comprising:
a communication circuit,
wherein the controller is configured to:
generate information related to location movement based on an identified result of the voltage value of the DC power rectified via the rectification circuit, and
control the communication circuit to transmit the generated information related to the location movement.

9. The electronic device of claim 8, wherein the information related to the location movement includes at least one of information indicating that a location of the electronic device is closer than a specified distance to a wireless power transmitter or farther away than the specified distance from the wireless power transmitter, or information related to a movement distance.

10. The electronic device of claim 8, wherein the information related to the location movement is included in a power receiving unit (PRU) dynamic message and transmitted.

11. The electronic device of claim 1, wherein the controller is configured to determine that a location of the electronic device is closer than a specified distance to a wireless power transmitter based on the voltage value of the DC power increasing.

12. The electronic device of claim 1, wherein the controller is configured to determine that a location of the electronic device is farther away than a specified distance from a wireless power transmitter based on the voltage value of the DC power decreasing.

13. A method for controlling wireless charging in an electronic device, the method comprising:
receiving a first power from a wireless power transmitter;
identifying whether the electronic device has moved based on a value sensed via a sensor;
based on identifying that the electronic device has moved, identifying a voltage value of a direct current (DC) power rectified via a rectification circuit configured to rectify the received first power into the DC power; and
based on identifying that the voltage value of the DC power rectified via the rectification circuit increases, controlling a DC/DC converter to increase an impedance of a rear end of the rectification circuit by adjusting an output of the DC/DC converter, to decrease power transfer efficiency of the electronic device.

14. The method of claim 13, wherein controlling the output of the DC/DC converter includes controlling at least one of an output voltage or an output current of the DC/DC converter.

15. The method of claim 13, further comprising:
controlling the output of the DC/DC converter to decrease an impedance of a rear end of the rectification circuit based on the voltage value of the DC power decreasing.

16. The method of claim 13, further comprising:
generating information related to location movement based on an identified result of the voltage value of the DC power rectified via the rectification circuit; and
transmitting the generated information related to the location movement via a communication circuit.

17. The method of claim 16, wherein the information related to the location movement includes at least one of information indicating that a location of the electronic device is closer than a specified distance to a wireless power transmitter or farther away than the specified distance from the wireless power transmitter, or information related to a movement distance.

18. The method of claim 16, wherein the information related to the location movement is included in a power receiving unit (PRU) dynamic message and transmitted.

* * * * *